US011015011B2

(12) United States Patent
Kitamura et al.

(10) Patent No.: US 11,015,011 B2
(45) Date of Patent: May 25, 2021

(54) METHOD FOR PRODUCING MALEIMIDE BLOCK COPOLYMER

(71) Applicant: Nippon Shokubai Co., Ltd., Osaka (JP)

(72) Inventors: Tomoaki Kitamura, Himeji (JP); Shin-ya Imoto, Himeji (JP); Hidetaka Nakanishi, Himeji (JP); Yutaka Takahashi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 223 days.

(21) Appl. No.: 16/095,862

(22) PCT Filed: Apr. 14, 2017

(86) PCT No.: PCT/JP2017/015330
§ 371 (c)(1),
(2) Date: Oct. 23, 2018

(87) PCT Pub. No.: WO2017/188031
PCT Pub. Date: Nov. 2, 2017

(65) Prior Publication Data
US 2020/0247934 A1    Aug. 6, 2020

(30) Foreign Application Priority Data

Apr. 28, 2016  (JP) .............................. JP2016-091630
Apr. 4, 2017   (JP) .............................. JP2017-074859

(51) Int. Cl.
*C08F 293/00* (2006.01)
*G02B 1/14* (2015.01)
*C08J 5/18* (2006.01)
*G02F 1/1335* (2006.01)

(52) U.S. Cl.
CPC ............ *C08F 293/005* (2013.01); *C08J 5/18* (2013.01); *G02B 1/14* (2015.01); *C08F 2438/02* (2013.01); *C08J 2353/00* (2013.01); *G02F 1/133528* (2013.01)

(58) Field of Classification Search
CPC .................................. G02B 1/04; C08L 33/24
See application file for complete search history.

(56) References Cited

U.S. PATENT DOCUMENTS 5,314,962 A * 5/1994 Otsu .................... C08F 293/00
                                              522/116
6,417,306 B1   7/2002 Ueda et al.

FOREIGN PATENT DOCUMENTS

| EP | 0286376 A2 | 10/1988 |
|----|------------|---------|
| JP | 61-171708  | 8/1986  |
| JP | 2-167325   | 6/1990  |
| JP | 2000-506918 A | 6/2000 |
| JP | 2001-233919 A | 8/2001 |
| JP | 2003-128707 A | 5/2003 |
| JP | 2010-13613 A | 1/2010 |
| JP | 2014-12782 A | 1/2014 |
| WO | WO 97/33925 A1 | 9/1997 |

OTHER PUBLICATIONS

International Preliminary Report on Patentability for PCT/JP2017/015330 dated Oct. 30, 2018.
Supplementary European Search Report for EP 17789316 dated Nov. 11, 2019.
International Search Report for PCT/JP2017/015330 dated Jun. 26, 2017.

* cited by examiner

*Primary Examiner* — Mark S Kaucher
(74) *Attorney, Agent, or Firm* — Knobbe Martens Olson & Bear LLP

(57) ABSTRACT

An object of the present invention is to provide a method for producing a maleimide block copolymer having an acrylic monomer-derived structural unit. Provided is a method for producing a block copolymer having a polymer block (A) containing an acrylate-derived structural unit and a polymer block (B) containing an N-substituted maleimide ring structure and a methacrylate-derived structural unit, the method comprising a polymerization step in which a nitroxide polymer (A1) having a polymer block (A) and an organophosphorus unit-containing nitroxide structure at an end of the polymer block (A) and a monomer (B1) containing a methacrylate and an N-substituted maleimide are polymerized in the presence of a thiol compound (C1).

21 Claims, No Drawings

METHOD FOR PRODUCING MALEIMIDE BLOCK COPOLYMER

CROSS REFERENCE TO RELATED APPLICATIONS

This application is a U.S. National Phase Application of PCT International Application Number PCT/JP2017/015330, filed on Apr. 14, 2017, designating the United States of America and published in the Japanese language, which is an International Application of and claims the benefit of priority to Japanese Patent Application No. 2016-091630, filed on Apr. 28, 2016, and Japanese Patent Application No. 2017-074859, filed on Apr. 4, 2017. The disclosures of the above-referenced applications are hereby expressly incorporated by reference in their entireties.

TECHNICAL FIELD

The present invention relates to a method for producing a block copolymer having a polymer block containing an acrylate-derived structural unit and a polymer block containing an N-substituted maleimide ring structure and a methacrylate-derived structural unit.

BACKGROUND ART

In recent years, transparent resins have been widely used for optical components such as optical lenses, prisms, mirrors, optical discs, optical fibers, sheets and films for liquid crystal displays, and lightguide plates.

For these optical components, acrylic resins have mainly been used as a material. Particularly, acrylic resins with a ring structure are transparent as well as heat resistant, and therefore used for optical films etc.

Also, polymers obtained by polymerization using a maleimide monomer are known to be thermoplastic resins with excellent heat-resistance and to be suitable as a material for optical films due to their excellent transparency and adjustable retardation.

Therefore, acrylic resins with a maleimide ring structure obtained by polymerization using a maleimide monomer are suitable for use in optical films.

Generally, acrylic polymers decompose through a depolymerization reaction from the polymer end. To impart thermal decomposition resistance to acrylic polymers, it is necessary to block the molecular end by modifying it with a thiol-based chain transfer agent, such as dodecyl mercaptan, to form a thioether group.

However, when a maleimide monomer is polymerized in the presence of a thiol-based chain transfer agent, the maleimide monomer concomitantly reacts with the thiol-based chain transfer agent to form a Michael addition product, from which the maleimide monomer may be undesirably reproduced. In addition, in the case where the maleimide monomer is left behind in large amount, such a large amount of the maleimide monomer causes a problem of volatilization during the treatment (e.g., heat-treatment etc.) of the resulting resin.

Therefore, regarding the polymerization of an acrylic monomer and a maleimide monomer, there has been a desire for a polymerization method which can reduce the amount of the residual maleimide monomer.

Meanwhile, a block polymer obtained by living radical polymerization is proposed as an acrylic resin provided with flexibility to compensate for the hardness and brittleness of maleimide polymers (Patent Literature 2).

CITATION LIST

Patent Literature

Patent Literature 1: JP-A 2001-233919
Patent Literature 2: JP-A 2014-12782

SUMMARY OF INVENTION

Technical Problem

An object of the present invention is to provide a method for producing a maleimide block copolymer having an acrylic monomer-derived structural unit.

Another object of the present invention is to provide a method for producing a maleimide block copolymer which has an acrylic monomer-derived structural unit and is excellent in flexibility and strength.

Yet another object of the present invention is to provide a method for producing a maleimide block copolymer which has an acrylic monomer-derived structural unit and is excellent in thermal decomposition resistance.

Yet still another object of the present invention is to provide a method for producing a maleimide block copolymer having an acrylic monomer-derived structural unit, in which method, only a small amount of unreacted maleimide monomer is left behind.

Yet still another object of the present invention is to provide a novel maleimide block copolymer having an acrylic monomer-derived structural unit and a film containing the block copolymer.

Solution to Problem

The present inventors have conducted intensive research to achieve the above-mentioned objects. As a result, the present inventors have found that polymerization of a nitroxide polymer (A1) having a polymer block (A) containing an acrylate-derived structural unit and an organophosphorus unit-containing nitroxide structure at an end of the polymer block (A) and a monomer (B1) containing a methacrylate and an N-substituted maleimide in the presence of a thiol compound (C1) yields a block copolymer with excellent flexibility and strength.

Such a polymerization method is usually living radical polymerization. Thiol compounds generally inhibit a polymerization reaction and therefore are not used in living radical polymerization. In consideration of this fact, the idea of using thiol compounds in living radical polymerization is surprising in itself. Even more surprisingly, the present inventors have found that, in such a polymerization method, which is living radical polymerization using a thiol compound, the polymerization reaction is unexpectedly inhibited.

It has also been found that, in such a polymerization method, the amount of the maleimide monomer remaining unreacted is reduced. This is probably because the maleimide monomer and the thiol compound are prevented from reacting to form a Michael addition product. The prevention of the formation of such a Michael addition product in spite of the presence of the maleimide monomer and the thiol compound is a surprising finding.

That is, the present invention relates to a method for producing a block copolymer having a polymer block (A)

containing an acrylate-derived structural unit and a polymer block (B) containing an N-substituted maleimide ring structure and a methacrylate-derived structural unit; and the like.

The method of the present invention for producing the block copolymer comprises a polymerization step in which a nitroxide polymer (A1) having a polymer block (A) and an organophosphorus unit-containing nitroxide structure at an end of the polymer block (A) and a monomer (B1) containing a methacrylate and an N-substituted maleimide are polymerized in the presence of a thiol compound (C1).

The present invention also includes a block copolymer having a polymer block (A) containing an acrylate-derived structural unit and a polymer block (B) containing an N-substituted maleimide ring structure and a methacrylate-derived structural unit. This block copolymer (novel block copolymer) may have a weight-average molecular weight of 150,000 to 450,000, for example.

The block copolymer may be produced by the above-described production method.

The present invention also includes a resin composition containing the block copolymer. This resin composition may contain the block copolymer and a second resin as resin components. The second resin may be, for example, a resin having the same backbone as that of the block copolymer (e.g., a resin having a structural unit derived from at least one kind of monomer selected from a methacrylate and an N-substituted maleimide, particularly a resin having a structural unit derived from the monomer (B1)).

Representative examples of the resin composition containing the second resin include resin compositions which contain, as resin components, the block copolymer and a resin having a structural unit derived from at least one kind of monomer selected from a methacrylate and an N-substituted maleimide (e.g., a polymer having a structural unit derived from the monomer (B1)) and which is characterized in that the weight-average molecular weight of all the resin components is 50,000 to 500,000.

The present invention also includes a film containing the block copolymer or the resin composition (e.g., an optical film, such as a polarizer protection film), a polarizing plate having the film, and an image display device having the polarizing plate.

Advantageous Effects of Invention

The production method of the present invention provides a maleimide block copolymer having an acrylic monomer-derived structural unit.

This block copolymer is excellent in flexibility and strength.

The block copolymer, which is terminally blocked by a thiol compound, is also excellent in thermal decomposition resistance.

Moreover, in the production method of the present invention, only a small amount of unreacted maleimide monomer is left behind. Since the amount of the residual maleimide monomer in the polymerization reaction mixture is reduced, less maleimide monomer volatilizes during heat treatment of the polymerization reaction mixture, resulting in reduction in the amount of the maleimide monomer adhering to the production equipment.

In another aspect, the present invention provides a novel block copolymer having a polymer block containing an acrylate-derived structural unit and a polymer block containing an N-substituted maleimide ring structure and a methacrylate-derived structural unit; and a resin composition containing the block copolymer.

Such a block copolymer or resin composition has excellent physical properties (characteristics) such as excellent heat resistance, and is therefore highly useful for optical films etc.

DESCRIPTION OF EMBODIMENTS

Hereinafter, the present invention will be described in detail.

An aspect of the present invention is a method for producing a block copolymer having a polymer block (A) containing an acrylate-derived structural unit (this term is sometimes referred to simply as an "acrylate unit" and the same applies to similar terms herein below) and a polymer block (B) containing an N-substituted maleimide ring structure and a methacrylate-derived structural unit (or methacrylate unit).

The production method of the present invention comprises a polymerization step in which a nitroxide polymer (A1) having a polymer block (A) and an organophosphorus unit-containing nitroxide structure at an end of the polymer block (A) and a monomer (B1) containing a methacrylate and an N-substituted maleimide are polymerized in the presence of a thiol compound (C1).

Nitroxide Polymer (A1)

The nitroxide polymer (A1) has a polymer block (A) containing an acrylate unit and an organophosphorus unit-containing nitroxide structure at an end of the polymer block (A).

The nitroxide polymer (A1) has an organophosphorus unit-containing nitroxide structure at at least one end of the polymer block (A), and preferably has such nitroxide structures at both ends of the polymer block (A).

The acrylate unit in the polymer block (A) is not particularly limited, and examples include structural units derived from acrylates including aliphatic acrylates [for example, alkyl acrylates (e.g., $C_{1-18}$ alkyl acrylates, such as methyl acrylate, ethyl acrylate and butyl acrylate) etc.], alicyclic acrylates [for example, cycloalkyl acrylates (e.g., $C_{3-20}$ cycloalkyl acrylates, such as cyclopropyl acrylate and cyclobutyl acrylate), bridged-ring acrylates (e.g., isobornyl acrylate), etc.], aromatic acrylates [for example, aryl acrylates (e.g., $C_{6-20}$ aryl acrylates, such as phenyl acrylate and o-tolyl acrylate), aralkyl acrylates (e.g., $C_{6-10}$ aryl $C_{1-4}$ alkyl acrylates, such as benzyl acrylate), phenoxyalkyl acrylates (e.g., phenoxy $C_{1-4}$ alkyl acrylates, such as phenoxyethyl acrylate), etc.], and the like.

The acrylate unit may be composed of one of these acrylates or two or more of them.

For higher flexibility etc., the acrylate unit preferably at least contains an alkyl acrylate unit, more preferably at least contains a $C_{1-18}$ alkyl acrylate unit, and still more preferably at least contains a n-butyl acrylate unit.

In the polymer block (A), the proportion of the alkyl acrylate unit in the acrylate unit is, for example, 50 to 100 mol %, and preferably 70 to 100 mol % in terms of monomers which constitute the polymer block (A). In addition, in the polymer block (A), the proportion of the alkyl acrylate unit in the acrylate unit is, for example, 50 to 100% by mass, and preferably 70 to 100% by mass.

The polymer block (A) may have one or more kinds of monomer units other than the acrylate unit.

In the nitroxide polymer (A1), the organophosphorus unit-containing nitroxide structure usually has a nitroxy free radical (N—O.).

The organophosphorus unit-containing nitroxide structure is, for example, a structure represented by the following formula (1):

[Chem. 1]

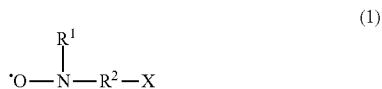

(1)

(wherein $R^1$ represents a hydrogen atom or a substituting group, $R^2$ represents a connecting group, and X represents an organophosphorus unit).

The substituting group represented by $R^1$ is, for example, a hydrocarbon group or the like.

Examples of the hydrocarbon group include aliphatic groups [for example, $C_{1-10}$ alkyl groups (e.g., a methyl group, an ethyl group, a n-propyl group, an isopropyl group, a n-butyl group, an isobutyl group, a tert-butyl group, etc.), preferably $C_{1-4}$ alkyl groups etc.], alicyclic groups [for example, $C_{3-12}$ cycloalkyl groups (e.g., a cyclopropyl group, a cyclobutyl group, a cyclopentyl group, a cyclohexyl group, etc.), preferably $C_{3-7}$ cycloalkyl groups etc.], aromatic groups {for example, $C_{6-20}$ aromatic groups [e.g., $C_{6-20}$ aryl groups (e.g., a phenyl group, an o-tolyl group, a m-tolyl group, a p-tolyl group, a 2,3-xylyl group, a 1-naphthyl group, etc.), $C_{7-20}$ aralkyl groups (e.g., a benzyl group etc.), etc.] etc.}, and the like. The hydrocarbon group may have a substituting group (for example, a halogen atom etc.).

In formula (1), $R^1$ is preferably an aliphatic group, more preferably a $C_{1-10}$ alkyl group, and still more preferably a $C_{1-4}$ alkyl group.

The connecting group represented by $R^2$ is, for example, a hydrocarbon group or the like.

Examples of the hydrocarbon group include aliphatic groups [for example, $C_{1-10}$ alkyl groups (e.g., a methyl group, an ethyl group, a n-propyl group, an isopropyl group, a n-butyl group, an isobutyl group, a tert-butyl group, etc.), preferably $C_{1-5}$ alkyl groups etc.], alicyclic groups [for example, $C_{3-12}$ cycloalkyl groups (e.g., a cyclopropyl group, a cyclobutyl group, a cyclopentyl group, a cyclohexyl group, etc.), preferably $C_{3-7}$ cycloalkyl groups etc.], aromatic groups {for example, $C_{6-20}$ aromatic groups [e.g., $C_{6-20}$ aryl groups (e.g., a phenyl group, an o-tolyl group, a m-tolyl group, a p-tolyl group, a 2,3-xylyl group, a 1-naphthyl group, etc.), $C_{7-20}$ aralkyl groups (e.g., a benzyl group etc.), etc.] etc.}, and the like. The hydrocarbon group may have a substituting group (for example, a halogen atom etc.).

In formula (1), $R^2$ is preferably an aliphatic group, more preferably a $C_{1-10}$ alkyl group, and still more preferably a $C_{1-5}$ alkyl group.

The organophosphorus unit represented by X is a phosphorus-containing group.

Preferably, the phosphorus-containing group at least contains a structure represented by $P(=O)OR^3$ (wherein $R^3$ represents a hydrogen atom or a hydrocarbon group).

Examples of the hydrocarbon group represented by $R^3$ include aliphatic groups [for example, $C_{1-10}$ alkyl groups (e.g., a methyl group, an ethyl group, a n-propyl group, an isopropyl group, a n-butyl group, an isobutyl group, a tert-butyl group, etc.), preferably $C_{1-4}$ alkyl groups etc.], alicyclic groups (for example, $C_{3-12}$ cycloalkyl groups etc.), aromatic groups (for example, $C_{6-20}$ aromatic groups etc.), and the like.

$R^3$ is preferably an aliphatic group, more preferably a $C_{1-10}$ alkyl group, and still more preferably a $C_{1-4}$ alkyl group.

The organophosphorus unit is preferably the structure represented by the following formula (2):

[Chem. 2]

(2)

[wherein $R^3$ represents a hydrogen atom or a hydrocarbon group, and Y represents a hydrogen atom or $—OR^4$ (wherein $R^4$ is a hydrogen atom or a hydrocarbon group)].

Examples of the hydrocarbon group represented by $R^3$ include the above-mentioned hydrocarbon groups etc.

Examples of the hydrocarbon group represented by $R^4$ include aliphatic groups [for example, $C_{1-10}$ alkyl groups (e.g., a methyl group, an ethyl group, a n-propyl group, an isopropyl group, a n-butyl group, an isobutyl group, a tert-butyl group, etc.), preferably $C_{1-4}$ alkyl groups etc.], alicyclic groups (for example, $C_{3-12}$ cycloalkyl groups etc.), aromatic groups (for example, $C_{6-20}$ aromatic groups etc.), and the like.

$R^4$ is preferably an aliphatic group, more preferably a $C_{1-10}$ alkyl group, and still more preferably a $C_{1-4}$ alkyl group.

In formula (2), preferably, $R^3$ is a $C_{1-4}$ alkyl group, and Y is a hydrogen atom or $—OR^4$. More preferably, $R^3$ is a $C_{1-4}$ alkyl group, Y is $—OR^4$, and $R^4$ is a $C_{1-4}$ alkyl group.

Among the above embodiments, the organophosphorus unit-containing nitroxide structure is particularly preferably a structure represented by formula (1) wherein $R^1$ is a $C_{1-4}$ alkyl group, $R^2$ is a $C_{1-5}$ alkyl group, and X is a structure represented by formula (2) wherein $R^3$ is a $C_{1-4}$ alkyl group and Y is a hydrogen atom or $—OR^4$.

The organophosphorus unit-containing nitroxide structure is, for example, the structure represented by the following formula (1-1):

[Chem. 3]

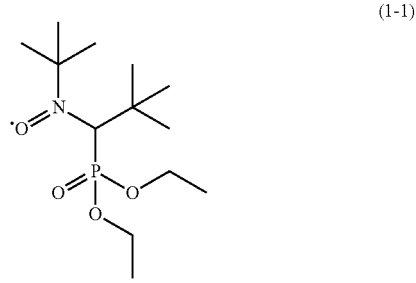

(1-1)

In the nitroxide polymer (A1), the polymer block (A) is usually in the form of a straight chain.

The nitroxide polymer (A1) may have two or more organophosphorus unit-containing nitroxide structures.

In the nitroxide polymer (A1), it is sufficient that the organophosphorus unit-containing nitroxide structure is present at one end of the polymer block (A), but it is preferable that the organophosphorus unit-containing nitroxide structure is present at both ends of the polymer block (A).

Particularly preferably, the nitroxide polymer (A1) has organophosphorus unit-containing nitroxide structures at both ends of a straight-chain polymer block (A). By using such a nitroxide polymer (A1), a block copolymer having the polymer blocks (B) at both ends of the polymer block (A) can be efficiently obtained.

The weight-average molecular weight (Mw) of the nitroxide polymer (A1) as measured by gel permeation chromatography (GPC) is not particularly limited and is, for example, 40,000 to 300,000, preferably 50,000 to 250,000.

The nitroxide polymer (A1) may be a commercial product, and for example, Flexibloc (registered trademark) D2 (manufactured by Arkema France) etc., can be used.

Monomer (B1)

The monomer (B1) at least contains a methacrylate and an N-substituted maleimide.

The methacrylate is not particularly limited, and examples include aliphatic methacrylates [for example, alkyl methacrylates (e.g., $C_{1-18}$ alkyl methacrylates, such as methyl methacrylate, ethyl methacrylate and butyl methacrylate) etc.], alicyclic methacrylates [for example, cycloalkyl methacrylates (e.g., $C_{3-20}$ cycloalkyl methacrylates, such as cyclopropyl methacrylate and cyclobutyl methacrylate), bridged-ring methacrylates (e.g., isobornyl methacrylate), etc.], aromatic methacrylates [for example, aryl methacrylates (e.g., $C_{6-20}$ aryl methacrylates, such as phenyl methacrylate and o-tolyl methacrylate), aralkyl methacrylates (e.g., $C_{6-10}$ aryl $C_{1-4}$ alkyl methacrylates, such as benzyl methacrylate), phenoxyalkyl methacrylates (e.g., phenoxy $C_{1-4}$ alkyl methacrylates, such as phenoxyethyl methacrylate), etc.], and the like. One of these methacrylates or two or more of them may be used.

Among these methacrylates, preferably an alkyl methacrylate, more preferably a $C_{1-18}$ alkyl methacrylate, still more preferably methyl methacrylate is at least contained in the monomer (B1) for higher transparency etc.

The proportion of the alkyl methacrylate in the methacrylate is, for example, 50 to 95% by mass, and preferably 70 to 90% by mass. In addition, the proportion of the alkyl methacrylate in the methacrylate is, for example, 50 to 95 mol %, and preferably 70 to 90 mol %.

The N-substituted maleimide is not particularly limited, and examples include N-alkyl maleimides (for example, N—$C_{1-10}$ alkyl maleimides, such as N-methyl maleimide and N-ethyl maleimide, etc.), N-cycloalkyl maleimides (for example, N—$C_{3-20}$ cycloalkyl maleimides, such as cyclohexyl maleimide, etc.), N-aryl maleimides (for example, N—$C_{6-10}$ aryl maleimides, such as N-phenyl maleimide, etc.), N-aralkyl maleimides (for example, N—$C_{7-10}$ aralkyl maleimides, such as N-benzyl maleimide, etc.), and the like. One of these N-substituted maleimides or two or more of them may be used.

Among these N-substituted maleimides, N-cycloalkyl maleimides, N-aryl maleimides, etc. are preferable, and N-cyclohexyl maleimide, N-phenyl maleimide, etc. are more preferable for better optical characteristics etc.

The mass ratio of the methacrylate and the N-substituted maleimide in the monomer (B1) is not particularly limited and is, for example, 60/40 to 95/5, preferably 70/30 to 93/7, more preferably 75/25 to 90/10.

The monomer (B1) may contain, in addition to the methacrylate and the N-substituted maleimide, another monomer.

Examples of the additional monomer include styrene monomers [for example, styrene, vinyltoluene, a styrene having a substituting group (e.g., a halogen group, an alkoxy group, an alkyl group, a hydroxy group or the like) (e.g., α-methylstyrene, chlorostyrene, etc.), styrene sulfonic acid or a salt thereof, etc.], methacrylic acid, acrylic acid, vinyl compounds [for example, vinyl esters (e.g., vinyl acetate) etc.], α,β-unsaturated nitriles (e.g., acrylonitrile, methacrylonitrile, etc.), olefins (e.g., $C_{2-10}$ alkenes, such as ethylene, propylene, 1-butene, isobutylene and 1-octene, etc.), and the like. One of these compounds or two or more of them may be used as the additional monomer.

The additional monomer can be selected as appropriate for the application of the block copolymer. Because of ease of adjusting optical characteristics etc., preferred is a styrene monomer, and more preferred is styrene.

The proportion of the methacrylate and the N-substituted maleimide in the monomer (B1) is, for example, 50 to 95% by mass, and preferably 70 to 90% by mass. In addition, the proportion of the methacrylate and the N-substituted maleimide in the monomer (B1) is, for example, 50 to 95 mol %, and preferably 70 to 90 mol %.

In the case where the monomer (B1) contains the additional monomer, the proportion of the additional monomer is, for example, 1 to 20 parts by mass, and preferably 1 to 10 parts by mass relative to 100 parts by mass of the combination of the methacrylate and the N-substituted maleimide.

Thiol Compound (C1)

The thiol compound (C1) may be any thiol compound that can be used as a chain transfer agent.

The thiol compound (C1) is not particularly limited, and examples include aliphatic thiols [for example, alkane thiols (e.g., $C_{1-20}$ alkane thiols, such as butanethiol, octanethiol, decanethiol, dodecanethiol (dodecyl mercaptan), hexadecanethiol, octadecanethiol and decanetrithiol, etc.), cycloalkyl mercaptans (e.g., $C_{3-20}$ cycloalkyl mercaptans, such as cyclohexyl mercaptan, etc.), etc.], aromatic thiols (e.g., $C_{6-20}$ aryl mercaptans, such as thiophenol, etc.), mercaptocarboxylates [for example, thioglycolates (e.g., $C_{1-20}$ alkyl thioglycolates, such as octyl thioglycolate, etc.), mercaptopropionates (e.g., $C_{1-20}$ alkyl mercaptopropionates, such as octyl 2-mercaptopropionate, octyl 3-mercaptopropionate and 2-ethylhexyl mercaptopropionate, etc.), etc.], mercaptoalkyl alkanoates (e.g., mercapto $C_{1-20}$ alkyl $C_{1-20}$ alkanoates, such as 2-mercaptoethyl octanoate, etc.), ethylene glycol bis(mercaptoalkyl) ethers (e.g., ethylene glycol bis (mercapto $C_{1-20}$ alkyl) ethers, such as 1,8-dimercapto-3,6-dioxaoctane, etc.), and the like. One of these thiol compounds or two or more of them may be used.

Among these thiol compounds, those having a hydrocarbon group of 3 carbon atoms or more are preferable.

Method for Producing a Block Copolymer

The polymerization step (I) for polymerizing the nitroxide polymer (A1) and the monomer (B1) results in the formation of a block copolymer (1) having the polymer block (A) and the polymer block (B).

The method for polymerizing the nitroxide polymer (A1) and the monomer (B1) is usually living radical polymerization.

The nitroxide polymer (A1) and the monomer (B1) are polymerized via the nitroxide structure of the nitroxide polymer (A1) to form the block copolymer (1).

The polymerization step (I) for polymerizing the nitroxide polymer (A1) and the monomer (B1) is performed in the presence of a thiol compound (C1).

The block copolymer (1) has an organophosphorus unit-containing nitroxide structure at an end of the block copolymer (1), and the nitroxide structure is considered to repeatedly dissociate from and rebind to the block copolymer (1). At the time when the nitroxide structure is not bound to the block copolymer (1), the radical derived from the thiol compound (C1) binds to the end of the block copolymer (1) to form the block copolymer of the present invention.

The method for polymerizing the nitroxide polymer (A1) and the monomer (B1) is preferably solution polymerization.

The polymerization temperature is not particularly limited and is, for example, 80 to 130° C., preferably 90 to 120° C.

The polymerization time in the polymerization step (I) is not particularly limited and can be selected as appropriate for the polymerization temperature. For example, the polymerization time is 0.5 to 6 hours, and preferably 1 to 3 hours.

During the polymerization, the level of dissolved oxygen is preferably kept at 50 ppm or less by introducing an inert gas such as nitrogen.

The solvent used for the polymerization may be, for example, an alcohol solvent (for example, methanol, ethanol, etc.), an aromatic hydrocarbon solvent (for example, toluene, ethyl benzene, xylene, etc.), a ketone solvent (for example, acetone, methyl isobutyl ketone, methyl ethyl ketone, etc.), an ester solvent (for example, butyl acetate etc.), or the like. Among these solvents, particularly preferred are methanol, toluene, xylene, etc. One of these solvents may be used alone, and also two or more of them may be used in combination.

The amount of the polymerization solvent used is preferably 10 to 80% by weight of the amount of the monomer composition in the polymerization system.

A catalyst may be used in the polymerization.

The catalyst is not particularly limited, and for example, at least one selected from acids, bases, salts of acids and bases, metal complexes and metal oxides can be used. The kind of acid, base, salt, metal complex or metal oxide used is not particularly limited. In the case where the finally produced block copolymer or a resin composition or resin shaped product containing the block copolymer is used for applications in which transparency is of great importance, it is preferable to use a catalyst within the range that would not impair transparency or cause adverse effects such as coloration.

The acid is not limited, and examples include inorganic acids such as hydrochloric acid, sulfuric acid, phosphoric acid and phosphorous acid; and organic acids such as p-toluenesulfonic acid, phenylsulfonic acid, carboxylic acids and phosphates.

The base is not limited, and examples include metal hydroxides, amines, imines, alkali metal derivatives, alkoxides and ammonium hydroxide salts.

The acid or base salt is not limited, and examples include metal-organic acid salts (for example, metal carboxylates) and metal-inorganic acid salts (for example, metal carbonates etc.).

The metal of the metal-organic acid salts or the metal-inorganic acid salts is not limited as long as the metal neither impairs the characteristics of the finally produced block copolymer or a resin composition or resin shaped product containing the block copolymer nor causes environmental pollution at the time of disposal. Examples of the metal include alkali metals such as lithium, sodium and potassium; alkali-earth metals such as magnesium, calcium, strontium and barium; zinc; zirconium; and the like. Among these metals, preferred is zinc.

The carboxylic acid which constitutes the metal carboxylates is not limited, and examples include formic acid, acetic acid, propionic acid, butyric acid, valeric acid, hexanoic acid, heptanoic acid, octanoic acid, octylic acid, nonanoic acid, decanoic acid, lauric acid, myristic acid, palmitic acid, stearic acid, behenic acid, tridecanoic acid, pentadecanoic acid, heptadecanoic acid, lactic acid, malic acid, citric acid, oxalic acid, malonic acid, succinic acid, fumaric acid, maleic acid and adipic acid.

Specific preferable examples of the metal carboxylate include zinc acetate, zinc propionate, zinc octylate and zinc stearate.

The metal complex is not limited, and the organic component of the metal complex is, for example, acetyl acetone.

The metal oxide is not limited, and examples include zinc oxide, calcium oxide and magnesium oxide.

Among these exemplary catalysts, preferred are acid or base salts, more preferred are metal-organic acid salts, and particularly preferred are metal carboxylates.

The amount of the catalyst used is not particularly limited.

In the polymerization step (I) for polymerizing the nitroxide polymer (A1) and the monomer (B1), the mass ratio of the nitroxide polymer (A1) and the monomer (B1) is not particularly limited and is, for example, 3/97 to 40/60, preferably 5/95 to 30/70, more preferably 7/93 to 25/75.

In the polymerization step (I) for polymerizing the nitroxide polymer (A1) and the monomer (B1), the amount of the thiol compound (C1) used is not particularly limited and is, for example, 1 ppm to 10,000 ppm, preferably 10 ppm to 3,000 ppm, more preferably 50 ppm to 1,000 ppm when the total amount of the nitroxide polymer (A1) and the monomer (B1) is 100 parts by weight. In the case where the amount of the thiol compound (C1) used is 1 ppm or more, the resulting resin is excellent in heat resistance. For this reason, such an amount is preferable. In addition, in the case where the amount of the thiol compound (C1) used is 10,000 ppm or less, polymerization is allowed to sufficiently proceed. For this reason, such an amount is preferable.

After the polymerization step (I) for polymerizing the nitroxide polymer (A1) and the monomer (B1), additional polymerization may be performed. In the case where additional polymerization is performed, a resin composition containing the block copolymer can be obtained without the need of removal of residual monomers. The additional polymerization is preferably performed with a radical polymerization initiator.

Examples of the radical polymerization initiator include organic peroxides [for example, tert-amylperoxy isononanoate, t-amylperoxy 2-ethylhexanoate, tert-butylperoxy 3,5,5-trimethyl hexanoate, tert-butylperoxy laurate, tert-butylperoxy isopropyl monocarbonate, tert-hexylperoxy isopropyl monocarbonate, tert-butylperoxy acetate, 1,1-bis(tert-butylperoxy) 3,3,5-trimethyl cyclohexane, 1,1-bis(tert-butylperoxy) cyclohexane, tert-butylperoxy 2-ethylhexanoate, tert-butylperoxy isobutyrate, tert-hexylperoxy 2-ethylhexanoate, di-tert-butyl peroxide, 2,5-dimethyl-2,5-bis(tert-butylperoxy) hexane, etc.], azo compounds [for example, 2-(carbamoylazo)-isobutyronitrile, 1,1'-azobis(1-cyclohexanecarbonitrile), 2,2'-azobisisobutyronitrile, 2,2'-azobis(2-methylbutyronitrile), dimethyl 2,2'-azobisisobutyrate, 2,2'-azobis(2,4,4-trimethylpentane), 2,2'-azobis(2-methylpropane), etc.], and the like. One of these polymerization initiators may be used alone, and also two or more of them may be used in combination.

The amount of the polymerization initiator used is not particularly limited, but is preferably about 0.1 to 10 parts by weight, more preferably about 0.5 to 5 parts by weight relative to 100 parts by weight of the monomer [i.e., the monomer in the additional polymerization, for example, the residual monomer or the unreacted monomer in the monomer (B1) (the total amount including the monomer (B1) further added as needed)]. In another preferable embodiment, the radical polymerization initiator is treated prior to use to remove foreign substances and impurities therefrom using a filter or the like.

When the additional polymerization is performed, a chain transfer agent may be added.

Examples of the chain transfer agent include the thiol compound (C1) exemplified above; halides such as carbon tetrachloride, carbon tetrabromide, methylene chloride, bromoform and bromotrichloroethane; and unsaturated hydrocarbon compounds such as α-methylstyrene dimer, α-terpinene, γ-terpinene, dipentene and terpinolene. One of these chain transfer agents may be used alone, and also two or more of them may be used in combination. Among these chain transfer agents, thiol compounds (C1) having a hydrocarbon group of 3 carbon atoms or more are preferably used.

The amount of the chain transfer agent used is not particularly limited, but is preferably about 0.001 to 1 part by weight, more preferably about 0.01 to 0.3 part by weight relative to 100 parts by weight of the monomer [i.e., the monomer in the additional polymerization, for example, the residual monomer or the unreacted monomer in the monomer (B1) (the total amount including the monomer (B1) further added as needed)]. In another preferable embodiment, the chain transfer agent is treated prior to use to remove foreign substances and impurities therefrom using a filter or the like.

When the additional polymerization is performed, the monomer (B1) may be further added. The monomer (B1) to be added may be one kind of monomer, or a combination of two or more kinds of monomers.

The monomer (B1) to be added is preferably the additional monomer in the monomer (B1) described above. More preferably a styrene monomer, still more preferably styrene is contained in the monomer (B1).

The amount of the monomer (B1) to be added is not particularly limited and is, for example, 1 to 50 parts by mass, preferably 2 to 30 parts by mass relative to 100 parts by mass of the combination of the methacrylate and the N-substituted maleimide used in the polymerization step (I).

After the completion of the polymerization, the polymerization reaction mixture may be subjected to filtration, drying, addition of a solvent (e.g., an aromatic hydrocarbon solvent, such as toluene, etc.), heating, devolatilization, etc. if needed. The methods for these processes are not particularly limited and may be conventionally known ones.

In the polymerization step (I) or the additional polymerization step (II), another additive etc. may be added to the polymerization system. Examples of the additional additive include ultraviolet absorbers, antioxidants, stabilizers, reinforcers, flame retardants, antistatic agents, organic fillers, inorganic fillers, anti-blocking agents, resin modifiers, organic fillers, inorganic fillers, plasticizers, lubricants and retardation reducing agents. Such an additive may be added to, for example, the polymerization reaction mixture after the completion of the polymerization. The amount of the additional additive is not particularly limited.

In addition, another resin (e.g., a thermoplastic polymer etc.) etc. may be mixed with the polymerization reaction mixture after the completion of the polymerization. The amount of the additional resin is not particularly limited.

Examples of the ultraviolet absorber include benzophenone compounds, salicylate compounds, benzoate compounds, triazole compounds and triazine compounds.

Examples of the benzophenone compound include 2,4-dihydroxybenzophenone, 4-n-octyloxy-2-hydroxybenzophenone, 2,2'-dihydroxy-4,4'-dimethoxybenzophenone, 2-hydroxy-4-n-octyloxybenzophenone, bis(5-benzoyl-4-hydroxy-2-methoxyphenyl)methane and 1,4-bis(4-benzoyl-3-hydroxyphenone)-butane.

Examples of the salicylate compound include p-t-butylphenyl salicylate.

Examples of the benzoate compound include 2,4-di-t-butylphenyl-3',5'-di-t-butyl-4'-hydroxybenzoate.

Examples of the triazole compound include 2,2'-methylenebis[4-(1,1,3,3-tetramethylbutyl)-6-(2H-benzotriazol-2-yl)phenol], 2-(3,5-di-tert-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-tert-butyl phenol, 2-[5-chloro(2H)-benzotriazol-2-yl]-4-methyl-6-t-butyl phenol, 2-(2H-benzotriazol-2-yl)-4,6-di-t-butyl phenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl)phenol, a reaction product from methyl 3-(3-(2H-benzotriazol-2-yl)-5-t-butyl-4-hydroxyphenyl)propionate/polyethylene glycol 300, 2-(2H-benzotriazol-2-yl)-6-(straight-chain and side-chain dodecyl)-4-methyl phenol, 2-(5-methyl-2-hydroxyphenyl) benzotriazole, 2-[2-hydroxy-3,5-bis(α,α-dimethylbenzyl) phenyl]-2H-benzotriazole, and 3-(2H-benzotriazol-2-yl)-5-(1,1-dimethylethyl)-4-hydroxy-$C_{7-9}$ side-chain and straight-chain alkyl ester.

Examples of the triazine compound include 2-mono(hydroxyphenyl)-1,3,5-triazine compounds, 2,4-bis(hydroxyphenyl)-1,3,5-triazine compounds and 2,4,6-tris(hydroxyphenyl)-1,3,5-triazine compounds. Specific examples include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3,5-triazine, 2,4,6-tris(2-hydroxy-4-methoxyphenyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropan-2-yloxy)phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-butoxyphenyl)-

1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, and 2,4,6-tris(2-hydroxy-3-methyl-4-(1-(2-ethoxyhexyloxy)-1-oxopropan-2-yloxy)phenyl)-1,3,5-triazine.

Among these, ultraviolet absorbers having a 2,4-bis(2,4-dimethylphenyl)-6-[2-hydroxy-4-(3-alkyloxy-2-hydroxypropyloxy)-5-α-cumylphenyl]-s-triazine backbone (alkyloxy; a long-chain alkyloxy group, such as octyloxy, nonyloxy or decyloxy) are preferable because of their high compatibility with amorphous thermoplastic resins, particularly acrylic resins, and their excellent ultraviolet absorption ability.

In addition, ultraviolet absorbers having a 2,4,6-tris(hydroxyphenyl)-1,3,5-triazine backbone are preferably used. Among these triazine ultraviolet absorbers, ultraviolet absorbers having a 2,4,6-tris(2-hydroxy-4-long-chain alkyloxy group-substituted phenyl)-1,3,5-triazine backbone or a 2,4,6-tris(2-hydroxy-3-alkyl-4-long-chain alkyloxy group-substituted phenyl)-1,3,5-triazine backbone are particularly preferable.

Commercially available ultraviolet absorbers are, for example, triazine ultraviolet absorbers under the trade names "Tinuvin 1577", "Tinuvin 460", "Tinuvin 477" (manufactured by BASF Japan Ltd.), and "ADK STAB LA-F70" (manufactured by ADEKA); triazole ultraviolet absorbers under the trade names "ADK STAB LA-31" (manufactured by ADEKA); and the like.

One of these ultraviolet absorbers or any combination of two or more of them may be used.

The antioxidant is not particularly limited, and for example, one kind selected from known antioxidants, such as phenol-based antioxidants, phosphorus-based antioxidants and sulfur-based antioxidants, or any combination of two or more of them may be used.

Examples of the phenol-based antioxidant include n-octadecyl-3-(3,5-di-t-butyl-4-hydroxyphenyl)propionate, n-octadecyl-3-(3,5-di-t-butyl-4-hydroxyphenyl)acetate, n-octadecyl-3,5-di-t-butyl-4-hydroxy benzoate, n-hexyl-3,5-di-t-butyl-4-hydroxyphenyl benzoate, n-dodecyl-3,5-di-t-butyl-4-hydroxyphenyl benzoate, neododecyl-3-(3,5-di-t-butyl-4-hydroxyphenyl)propionate, dodecyl-β-(3,5-di-t-butyl-4-hydroxyphenyl)propionate, ethyl-α-(4-hydroxy-3,5-di-t-butylphenyl)isobutyrate, octadecyl-α-(4-hydroxy-3,5-di-t-butylphenyl)isobutyrate, octadecyl-α-(4-hydroxy-3,5-di-t-butyl-4-hydroxyphenyl)propionate, 2-(n-octylthio)ethyl-3,5-di-t-butyl-4-hydroxy benzoate, 2-(n-octylthio)ethyl-3,5-di-t-butyl-4-hydroxy phenylacetate, 2-(n-octadecylthio)ethyl-3,5-di-t-butyl-4-hydroxy phenylacetate, 2-(n-octadecylthio)ethyl-3,5-di-t-butyl-4-hydroxy benzoate, 2-(2-hydroxyethylthio)ethyl-3,5-di-t-butyl-4-hydroxy benzoate, diethylglycol bis-(3,5-di-t-butyl-4-hydroxy-phenyl)propionate, 2-(n-octadecylthio)ethyl-3-(3,5-di-t-butyl-4-hydroxyphenyl)propionate, stearamide-N,N-bis-[ethylene-3-(3,5-di-t-butyl-4-hydroxyphenyl)propionate], n-butylimino-N,N-bis-[ethylene-3-(3,5-di-t-butyl-4-hydroxyphenyl)propionate], 2-(2-stearoyloxyethylthio)ethyl-3,5-di-t-butyl-4-hydroxy benzoate, 2-(2-stearoyloxyethylthio)ethyl-7-(3-methyl-5-t-butyl-4-hydroxyphenyl)heptanoate, 1,2-propyleneglycol bis-[3-(3,5-di-t-butyl-4-hydroxyphenyl)propionate], ethylene glycol bis-[3-(3,5-di-t-butyl-4-hydroxyphenyl)propionate], neopentylglycol bis-[3-(3,5-di-t-butyl-4-hydroxyphenyl)propionate], ethylene glycol bis-(3,5-di-t-butyl-4-hydroxy phenylacetate), glycerin-1-n-octadecanoate-2,3-bis-(3,5-di-t-butyl-4-hydroxy phenylacetate), pentaerythritol tetrakis-[3-(3',5'-di-t-butyl-4'-hydroxyphenyl)propionate], 1,1,1-trimethylolethane tris-[3-(3,5-di-t-butyl-4-hydroxyphenyl)propionate], sorbitol hexa-[3-(3,5-di-t-butyl-4-hydroxyphenyl)propionate], 2-hydroxyethyl-7-(3-methyl-5-t-butyl-4-hydroxyphenyl)propionate, 2-stearoyloxyethyl-7-(3-methyl-5-t-butyl-4-hydroxyphenyl)heptanoate, 1,6-n-hexanediol bis[(3',5'-di-t-butyl-4-hydroxyphenyl)propionate], pentaerythritol tetrakis(3,5-di-t-butyl-4-hydroxyhydrocinnamate), 1,3,5-trimethyl-2,4,6-tris(3,5-di-t-butyl-4-hydroxybenzyl)benzene, 3,9-bis[1,1-dimethyl-2-[β-(3-t-butyl-4-hydroxy-5-methylphenyl)propionyloxy]ethyl]-2,4,8,10-tetraoxaspiro[5,5]-undecane, 2,4-di-t-amyl-6-[1-(3,5-di-t-amyl-2-hydroxyphenyl-2-hydroxy-5-methylbenzyl)-4-methylphenyl acrylate, and 1,3,5-tris(2,6-dimethyl-3-hydroxy-4-t-butylbenzyl)isocyanurate.

Examples of the thioether-based antioxidant include pentaerythrityl tetrakis(3-laurylthiopropionate), dilauryl 3,3'-thiodipropionate, dimyristyl 3,3'-thiodipropionate and distearyl 3,3'-thiodipropionate.

Examples of the phosphoric acid-based antioxidant include tris(2,4-di-t-butylphenyl)phosphite, 2-[[2,4,8,10-tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine, diphenyl tridecyl phosphite, triphenyl phosphite, 2,2-methylenebis(4,6-di-t-butylphenyl)octyl phosphite, bis(2,6-di-t-butyl-4-methylphenyl)pentaerythritol diphosphite, distearyl pentaerythritol diphosphite, and cyclic neopentanetetrayl bis(2,6-di-t-butyl-4-methylphenyl) phosphite.

Examples of the thermoplastic polymer include olefin polymers such as polyethylene, polypropylene, an ethylene-propylene copolymer and poly(4-methyl-1-pentene); vinyl halide polymers such as polyvinyl chloride, polyvinylidene chloride and polyvinyl chloride; styrene polymers such as polystyrene, a styrene-methyl methacrylate copolymer, a styrene-acrylonitrile copolymer and an acrylonitrile-butadiene-styrene block copolymer; polyesters such as polyethylene terephthalate, polybutylene terephthalate and polyethylene naphthalate; cellulose acylates such as cellulose triacetate, cellulose acetate propionate and cellulose acetate butylate; polyamides such as Nylon 6, Nylon 66 and Nylon 610; polyacetal; polycarbonate; polyphenylene oxide; polyphenylene sulfide; polyether ether ketone; polysulfone; polyether sulfone; polyoxybenzylene; polyamide-imide; gum polymers containing polybutadiene rubber and/or acrylic rubber, such as ABS resin and ASA resin; and the like.

Block Copolymer

According to the above-described production method, a block copolymer having a polymer block (A) containing an acrylate-derived structural unit and a polymer block (B) containing an N-substituted maleimide ring structure and a methacrylate-derived structural unit can be obtained.

The present invention also provides a block copolymer having a polymer block (A) containing an acrylate-derived structural unit and a polymer block (B) containing an N-substituted maleimide ring structure and a methacrylate-derived structural unit. Such a block copolymer may be produced by any production method, and in particular, may be produced by the method described above.

Such a block copolymer is a polyblock copolymer (for example, a di- to deca-block copolymer etc.). Preferably, the block copolymer at least has the polymer blocks (B) on both sides of the polymer block (A) (that is, the block copolymer has the structure (B)-(A)-(B)). In addition, the block copolymer preferably has a structural unit derived from the thiol compound (C1). The block copolymer preferably has a structural unit derived from the thiol compound (C1) at one end of the block copolymer, and more preferably has such structural units at both ends of the block copolymer.

The N-substituted maleimide ring structure in the block copolymer is preferably a unit represented by the following formula (3):

[Chem. 4]

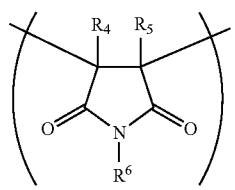

(3)

(wherein $R^4$ and $R^5$ are independently a hydrogen atom or a methyl group, and $R^6$ is a hydrogen atom or a substituting group).

The substituting group represented by $R^6$ in formula (3) is, for example, a hydrocarbon group or the like.

Examples of the hydrocarbon group include aliphatic groups {for example, alkyl groups [for example, $C_{1-6}$ alkyl groups, such as straight-chain $C_{1-6}$ alkyl groups (e.g., a methyl group, an ethyl group, etc.) and branched $C_{1-6}$ alkyl groups (e.g., an isopropyl group etc.), etc.] etc.}, alicyclic groups (for example, $C_{3-20}$ cycloalkyl groups, such as a cyclopentyl group and a cyclohexyl group, etc.), and aromatic groups {for example, $C_{6-20}$ aromatic groups [for example, $C_{7-20}$ aralkyl groups (e.g., a benzyl group etc.), $C_{6-20}$ aryl groups (for example, a phenyl group etc.), etc.]}. The hydrocarbon group may have a substituting group such as a halogen atom.

For desired purposes, including obtaining a highly heat-resistant block copolymer with a low birefringence index, in formula (3), preferably, $R^4$ and $R^5$ are independently hydrogen atoms, and $R^6$ is a $C_{3-20}$ cycloalkyl group or a $C_{6-20}$ aromatic group. More preferably, $R^4$ and $R^5$ are independently hydrogen atoms, and $R^6$ is a cyclohexyl group or a phenyl group.

The proportion of the N-substituted maleimide structure in the polymer block (B) of the block copolymer is, for example, 5 to 90% by mass, preferably 10 to 70% by mass, more preferably 10 to 60% by mass, and still more preferably 10 to 50% by mass in order to impart the block copolymer with excellent heat resistance etc.

In addition, the proportion of the N-substituted maleimide ring structure in the polymer block (B) of the block copolymer is, for example, 7 to 90 mol %, preferably 10 to 75 mol %, and more preferably 10 to 60 mol % in terms of monomers which constitute the polymer block (B) in order to impart the block copolymer with excellent heat resistance etc.

In the case where the block copolymer is a triblock copolymer, the proportion of the N-substituted maleimide ring structure in each polymer block (B) is desirably in the above range.

In the case where the polymer block (B) in the block copolymer has an additional unit, the proportion of the additional unit in the polymer block (B) is, for example, 30% by weight or less (e.g., 0.1 to 20% by weight), and preferably 15% by weight or less (e.g., 1 to 10% by weight). In addition, the proportion of the additional unit in the polymer block (B) is, for example, 30 mol % or less (e.g., 0.1 to 20 mol %), and preferably 15 mol % or less (e.g., 1 to 10 mol %) in terms of monomers which constitute the polymer block (B).

Particularly, in the case where the block copolymer is used for optical applications, for example, used in optical films etc., the block copolymer preferably has a styrene unit. One of the reasons is that the styrene unit can offset the positive birefringence of the N-substituted maleimide ring.

The proportion of the styrene unit in the polymer block (B) can be selected as appropriate for the desired optical characteristics etc. For example, the proportion of the styrene unit in the polymer block (B) is 0.1 to 15% by weight, preferably 1 to 10% by weight, and more preferably 3 to 8% by weight. In addition, the proportion of the styrene unit in the polymer block (B) is, for example, 0.1 to 20 mol %, preferably 1 to 12 mol %, and more preferably 3 to 10 mol % in terms of monomers which constitute the polymer block (B).

In the case where the block copolymer is a triblock copolymer, the proportion of the additional unit (e.g., a styrene unit etc.) in each polymer block (B) is desirably in the above range.

The proportion of the N-substituted maleimide ring structure in the block copolymer is, for example, 1 to 50% by mass, preferably 5 to 30% by mass, and more preferably 10 to 20% by mass in order to impart the block copolymer with excellent heat resistance etc.

In addition, the proportion of the N-substituted maleimide ring structure in the block copolymer is, for example, 2 to 80 mol %, preferably 7 to 50 mol %, and more preferably 15 to 30 mol % in terms of monomers which constitute the block copolymer in order to impart the block copolymer with excellent heat resistance etc.

In the case where the block copolymer is a triblock copolymer, the proportion of the N-substituted maleimide ring structure in each polymer block (B) is desirably in the above range.

The weight-average molecular weight (Mw) of the block copolymer as measured by GPC is not particularly limited and is, for example, 5,000 to 500,000, preferably 50,000 to 500,000, more preferably 100,000 to 500,000.

Particularly, the weight-average molecular weight (Mw) of the block copolymer as measured by GPC may be 450,000 or less (e.g., 150,000 to 450,000), preferably 180,000 to 450,000, more preferably 200,000 to 400,000. When the molecular weight is in such a range, sufficient film strength is easily obtainable. In addition, a moderate level of melt viscosity is easily obtainable, and therefore, there may be advantages in terms of workability. Moreover, gelation in the course of melt shaping is less likely to occur.

The molecular weight distribution (Mw/Mn) of the block copolymer is not particularly limited and is, for example, 1.1 to 2.7, preferably 1.2 to 2.3, more preferably 1.3 to 1.9.

In addition, the molecular weight distribution (Mw/Mn) of the block copolymer may be 1.65 or more (e.g., 1.65 to 2.5), preferably 1.7 to 2.4 (e.g., 1.8 to 2.3). When the molecular weight distribution is in such a range, films with excellent smoothness are easily obtainable.

In the block copolymer, the ratio of the weight-average molecular weights (Mws) of the polymer block (A) and the polymer block (B) is not particularly limited and is, for example, 1:0.5 to 1:3, preferably 1:0.8 to 1:2.5 (e.g., 1:0.9 to 1:2), more preferably 1:1 to 1:2.

In addition, in the block copolymer, the ratio of the number-average molecular weights (Mns) of the polymer block (A) and the polymer block (B) is not particularly limited and is, for example, 1:0.2 to 1:2, preferably 1:0.4 to 1:1.

When the molecular weight ratio is in such a range, a moderate range of viscosity of the block copolymer is easily obtainable in melt processing, and therefore, shaped products with excellent appearance such as excellent smoothness are easily obtainable.

In the case where the block copolymer is a triblock copolymer, the ratio of the weight-average molecular weights (Mws) of the polymer block (A) and the polymer block (B) and the ratio of their number-average molecular weights (Mns) are desirably in the above ranges.

The weight-average molecular weight (Mw) may be, for example, a value as measured by GPC in terms of polystyrene.

The thermal decomposition temperature of the block copolymer varies with the kind of the monomer used, the amount of the N-substituted maleimide ring structure, etc., but is, for example, 270° C. or more (e.g., 270° C. to 350° C.), preferably 280° C. to 350° C.

The glass transition temperature (Tg) of the block copolymer varies with the kind of the monomer used, the amount of the N-substituted maleimide ring structure, etc., but is, for example, 110° C. or more (e.g., 110° C. to 200° C.), preferably 115° C. to 160° C., more preferably 120° C. to 150° C.

Resin Composition and Film

The present invention also includes a resin composition containing the block copolymer. The resin composition contains the above-described block copolymer as a resin (or resin component) and may contain a second resin.

The second resin can be selected as appropriate for the application and is not particularly limited. The second resin may be a thermoplastic polymer, and examples of the thermoplastic polymer include olefin polymers such as polyethylene, polypropylene, an ethylene-propylene copolymer and poly(4-methyl-1-pentene); vinyl halide polymers such as polyvinyl chloride, polyvinylidene chloride and polyvinyl chloride; styrene polymers such as polystyrene, a styrene-methyl methacrylate copolymer, a styrene-acrylonitrile copolymer and an acrylonitrile-butadiene-styrene block copolymer; polyesters such as polyethylene terephthalate, polybutylene terephthalate and polyethylene naphthalate; cellulose acylates such as cellulose triacetate, cellulose acetate propionate and cellulose acetate butylate; polyamides such as Nylon 6, Nylon 66 and Nylon 610; polyacetal; polycarbonate; polyphenylene oxide; polyphenylene sulfide; polyether ether ketone; polysulfone; polyether sulfone; polyoxybenzylene; polyamide-imide; gum polymers containing polybutadiene rubber and/or acrylic rubber, such as ABS resin and ASA resin; and the like.

The gum polymer preferably has, on the surface, a graft structure whose composition is compatible with acrylic resins. In addition, the average particle diameter of the gum polymer is, for example, preferably 20 to 300 nm, more preferably 50 to 200 nm, and still more preferably 70 to 150 nm in order to obtain a highly transparent film containing the gum polymer.

Other examples of the second resin (thermoplastic polymer) include acrylic resins. Examples of the acrylic resin include resins corresponding to the block (A) and/or the block (B) [for example, methacrylate resins composed of a methacrylate (e.g., any of the methacrylates described above as examples, such as methyl methacrylate) as a polymerization component (e.g., resins composed of a methacrylate as a polymerization component, such as polymethyl methacrylate; and resins composed of a methacrylate and an aromatic vinyl compound as polymerization components, such as a methyl methacrylate-styrene copolymer); resins formed by introducing a ring structure into such a methacrylate resin (methacrylate resins having a ring structure, for example, resins having structural units derived from a methacrylate, an aromatic vinyl compound and a cyclic imide (a maleimide compound or the like), such as a methyl methacrylate-styrene-N-substituted maleimide copolymer, etc.); etc.] and block copolymers which do not fall within the category of the above-described block copolymer [for example, a block copolymer having a block identical to the block (B) except for the ring structure, such as a block copolymer having a block identical to the block (B) except for the N-substituted maleimide structure].

Particularly, the second resin may contain a resin having the same backbone as that of the block copolymer, for example, a resin corresponding to the block (B) (a resin having a structural unit derived from at least one kind of monomer selected from a methacrylate and an N-substituted maleimide, for example, a resin composed of a methacrylate as a polymerization component; a resin having a structural unit derived from the monomer (B1), such as a methacrylate-N-substituted maleimide copolymer and a methacrylate-styrene monomer-N-substituted maleimide copolymer; etc.); a resin corresponding to the block (A); a block copolymer having the block (A) and a block identical to the block (B) except for the ring structure [for example, a block copolymer having a block composed of methyl methacrylate as a polymerization component (hard block) and a block composed of an acrylate (butyl acrylate etc.) as a polymerization component (soft block) etc.]; or the like.

By mixing of the block copolymer of the present invention with an acrylic resin or a resin having the same backbone as that of the block copolymer, desired physical properties can efficiently be obtained without compromising the original compatibility etc.

Therefore, the block copolymer of the present invention can also be used as a modifier of another resin (particularly, an acrylic resin or a resin having the same backbone as that of the block copolymer).

Particularly, in the case where additional polymerization is performed as described above, a resin composition containing the block copolymer and a resin having the same backbone as that of the block copolymer [for example, a mixture (polymer blend) of the block copolymer and a polymer composed of the monomer (B1) as a polymerization component] can efficiently be obtained.

In the case where the resin composition of the present invention contains the second resin, the amount of the second resin in the resin composition can be selected as appropriate for the application etc. For example, the amount of the second resin in the resin composition is about 1 to 99% by mass (e.g., 5 to 90% by mass), preferably about 15 to 80% by mass (e.g., 20 to 75% by mass), and more preferably about 30 to 70% by mass.

In addition, in the case where the resin composition of the present invention contains the second resin [e.g., an acrylic resin (e.g., an acrylic resin having the same backbone as that of the block copolymer)], the ratio of the block copolymer of the present invention and the second resin can be selected as appropriate for the desired physical properties etc. For example, the former/latter ratio (mass ratio) may be about 99/1 to 1/99 (e.g., 95/5 to 5/95), preferably about 90/10 to 10/90 (e.g., 85/15 to 15/85), and more preferably about 70/30 to 30/70.

The physical properties (Mw, molecular weight distribution, thermal decomposition temperature, Tg, etc.) of such a resin composition containing the block copolymer do not need to be the same as those of the block copolymer, but may be selected from the same ranges specified above. For example, in the resin composition containing the block copolymer and the second resin, the physical properties of the whole resin components do not need to be equivalent to those of the block copolymer (for example, Mw is 50,000 to 500,000, 150,000 to 450,000, or the like.), but may be so.

The weight-average molecular weight (Mw) of the resin composition of the present invention as measured by GPC is not particularly limited. For example, the Mw of the resin composition may be about 50,000 or more (e.g., 50,000 to 500,000), preferably about 80,000 or more (e.g., 80,000 to 400,000), more preferably about 100,000 or more (e.g., 100,000 to 300,000). When the molecular weight is in such a range, a moderate level of melt viscosity is easily obtainable, and therefore, there are advantages in terms of shape processability. Also, there are advantages in terms of the physical properties (strength etc.) of the shaped product.

The glass transition temperature (Tg) of the resin composition of the present invention may be, for example, 110° C. or more (e.g., 110° C. to 200° C.), preferably 115° C. to 160° C., more preferably 120° C. to 150° C. When the glass transition temperature is in such a range, there are advantages, for example, the resulting shaped products are less likely to deform at general temperatures (e.g., within a range of temperatures in practical use of optical components) and less colored due to no need for shaping at excessively high temperatures.

The thermal decomposition temperature of the resin composition of the present invention varies with the kind of the monomer used, the amount of the N-substituted maleimide ring structure, etc., but may be, for example, 270° C. to 350° C., preferably 280° C. to 350° C.

The degree of coloration (YI) of the resin composition (or the block copolymer) of the present invention varies with the kind of the resin which constitutes the resin composition, the presence and absence of an additive (particularly an ultraviolet absorber), etc. For example, in the case where the resin which constitutes the resin composition (resin component) is the block copolymer or a combination of the block copolymer and a resin having a structural unit derived from at least one kind of monomer selected from a methacrylate and an N-substituted maleimide and the resin composition contains no ultraviolet absorber, YI is preferably 4.0 or less, and more preferably 3.5 or less.

On the other hand, in the case where the resin component is the block copolymer or a combination of the block copolymer and a resin having a structural unit derived from at least one kind of monomer selected from a methacrylate and an N-substituted maleimide and the resin composition contains an ultraviolet absorber, the degree of coloration YI is preferably 20.0 or less, and more preferably 17.5 or less.

The degree of coloration (YI) of the resin composition can be determined by dissolving a sample at a concentration of 15% in chloroform, transferring this solution to a quartz cell, and measuring the color with a colorimeter according to JIS-K7103.

The resin composition (or the block copolymer) may contain a conventional additive (any of the additives described as examples in the section of "Method for Producing a Block Copolymer", for example, an ultraviolet absorber, an antioxidant, etc.) depending on the application etc.

One kind of additive or a combination of two or more kinds of additives may be used. The proportion of the additive is not particularly limited and can be selected as appropriate for the kind etc. of the additive, the kind of the resin component, the application, etc.

For example, regarding ultraviolet absorbers, the amount used is not particularly limited, and may be about 0.1 to 10 parts by weight, preferably about 0.5 to 5 parts by weight relative to 100 parts by weight of the resin which constitutes the resin composition (resin component). When the amount used is in such a range, there are advantages in terms of ultraviolet absorption ability, resistance to bleeding out, and the like.

Particularly, in the case where the block copolymer (or a mixture of the block copolymer and the second resin) and a metal alkoxide are used as components, a resin composition having excellent strength may efficiently be obtained.

Examples of the metal alkoxide include alkoxides of typical metal elements, such as alkoxides of metals belonging to group 13 of the periodic table [for example, aluminum alkoxides (e.g., aluminum $C_{1-10}$ alkoxides, such as aluminum trimethoxide, aluminum triisopropoxide and ethylacetoacetate aluminum diisopropylate) etc.]; alkoxides of transition metal elements, such as alkoxides of metals belonging to group 4 of the periodic table [for example, titanium alkoxides (titanium $C_{1-10}$ alkoxides, such as titanium tetramethoxide and titanium tetraisopropoxide), zirconium alkoxides (zirconium $C_{1-10}$ alkoxides, such as zirconium tetramethoxide and zirconium isopropoxide), etc.]; silicon alkoxides (for example, mono- to tetra-$C_{1-10}$ alkoxy silanes, such as tetraethoxy silane and vinyl trimethoxy silane); and the like.

One kind of metal alkoxide or a combination of two or more kinds of metal alkoxides may be used.

In the resin composition containing a metal alkoxide, the proportion of the metal alkoxide may be, for example, about 0.0001 to 1 part by mass relative to 100 parts by mass of the resin component (or the block copolymer).

In the case where the block copolymer (or a mixture of the block copolymer and the second resin) and an antioxidant are used as components, a resin composition having excellent stability may efficiently be obtained.

Particularly, such an antioxidant may be composed of a combination of a phenol-based antioxidant (particularly a hindered phenol antioxidant), a phosphorus-based antioxidant and a sulfur-based antioxidant. Examples of these antioxidants include the antioxidants described above as examples.

In the case where these antioxidants are used in combination, the ratio (mass ratio) of a combination of the phenol-based antioxidant and the sulfur-based antioxidant to the phosphorus-based antioxidant may be, for example, about 2/3 to 8/1, preferably about 1/1 to 4/1, more preferably about 1/1 to 3/1.

In the resin composition containing an antioxidant, the proportion of the antioxidant may be, for example, about 0.0001 to 10 parts by mass, preferably about 0.001 to 1 part by mass relative to 100 parts by mass of the resin component (or the block copolymer).

A shaped product (for example, a film, a sheet or the like) from the block copolymer (for example, a block copolymer obtained by the production method of the present invention) or from the resin composition of the present invention is suitable for various applications, including but not limited to, optical applications, for example, used in protection films for optical use, optical films and optical sheets. The protection film for optical use is not particularly limited and may be any film that protects optical components. Examples of the protection film include protection films for substrates of various types of optical discs (VD, CD, DVD, MD, LD, etc.) and polarizer protection films used in polarizing plates for liquid crystal displays.

The optical film is not particularly limited and may be any film that has excellent optical properties. Preferable examples of the optical film include retardation films, zero retardation films (the in-plane retardation and the thickness direction retardation are infinitesimally small), birefringence compensation films, diffusion films, reflection films, anti-reflection films, anti-glare films, brightness enhancement films and conductive films for touch panels.

Examples of the optical sheet include diffusion plates, light guides, retardation plates, zero retardation plates and prism sheets.

The shaping method is not particularly limited, and conventionally known methods may be employed.

For example, the block copolymer or the resin composition is subjected to a known film forming process [for example, solvent casting (solution casting), melt extrusion, calendering, compression molding, or the like] to give a film. Preferable film forming processes are solvent casting, melt extrusion, etc.

In the film forming, if desired, the block copolymer may be mixed with a solvent, another resin (e.g., a thermoplastic polymer etc.), another additive (e.g., an ultraviolet absorber, an antioxidant, a stabilizer, a reinforcer, a flame retardant, an antistatic agent, an organic filler, an inorganic filler, an anti-blocking agent, a resin modifier, an organic filler, an inorganic filler, a plasticizer, a lubricant, a retardation reducing agent, etc.) and/or the like.

The amount of the ultraviolet absorber in the film is not particularly limited, but is preferably 0.01 to 10% by mass, more preferably 0.05 to 5% by mass in the film. When the amount used is too small, the ultraviolet absorber serves less to improve weather resistance. When the amount used is too large, the ultraviolet absorber may cause mechanical strength reduction and yellowing.

The apparatus for solvent casting is, for example, a drum-type casting machine, a band-type casting machine or a spin coater.

The solvent used for solvent casting is not limited as long as the block copolymer is soluble therein. Examples of the solvent include aromatic hydrocarbons such as benzene, toluene and xylene; aliphatic hydrocarbons such as cyclohexane and decalin; esters such as ethyl acetate and butyl acetate; ketones such as acetone, methyl ethyl ketone and methyl isobutyl ketone; alcohols such as methanol, ethanol, isopropanol, butanol, isobutanol, methyl cellosolve, ethyl cellosolve and butyl cellosolve; ethers such as tetrahydrofuran and dioxane; halogenated hydrocarbons such as dichloromethane, chloroform and carbon tetrachloride; dimethylformamide; and dimethyl sulfoxide. One of these solvents or two or more of them may be used.

The melt extrusion is performed by, for example, a T-die method or an inflation method. The molding temperature in the melt extrusion is preferably 150 to 350° C., and more preferably 200 to 300° C.

In the case where a T-die method is selected, for example, a belt-like film can be formed using a known extruder with a T-die attached to the tip thereof. The belt-like film may be rolled up around a roll into a film roll. In the melt extrusion, a series of steps, which start with preparation of an acrylic resin by mixing materials and end with molding of a film using the resin, can be continuously performed. On the belt-like film, an adhesion promoting layer may be formed to give a belt-like optical film.

The film may be a biaxially oriented film for increased mechanical strength. The biaxially oriented film may be a biaxially oriented film formed by simultaneous or sequential stretching. In addition, the direction of the slow axis of the biaxially oriented film may be a film-feeding direction, a width direction, or any other direction.

The thickness of the film is not particularly limited and can be selected as appropriate for the application, etc. For example, the thickness is 1 to 400 µm, preferably 5 to 200 µm, more preferably 10 to 100 µm, and still more preferably 20 to 60 µm.

In one example where the film is used in protection films, anti-reflection films, polarizing films, etc. for image display devices such as liquid crystal displays and organic EL displays, the thickness of the film is preferably 1 to 250 µm, more preferably 10 to 100 µm, and still more preferably 20 to 80 µm.

In another example where the film is used in transparent conductive films etc. for ITO deposition films, silver nanowire films, metal mesh films, etc., the thickness of the film is preferably 20 to 400 µm, more preferably 30 to 350 µm, and still more preferably 40 to 300 µm.

The haze of the film is 1% or preferably less (e.g., 0 to 1%), and more preferably 0.5% or less (e.g., 0 to 0.5%).

The haze is measured as specified in JIS K7136.

The b value of the film is preferably 2% or less (e.g., 0.1 to 2%), more preferably 1.5% or less (e.g., 0.1 to 1.5%), still more preferably 1% or less (e.g., 0.1 to 1%), and yet still more preferably 0.5% or less (e.g., 0.1 to 0.5%).

The Tg of the film is, for example, 110° C. or more (e.g., 110° C. to 200° C.), and preferably 115° C. to 160° C.

Polarizer Protection Film

The film of the present invention can be used as a polarizer protection film in polarizing plates of image display devices such as liquid crystal displays (LCDs). Usually, the film can be used as it is as a polarizer protection film.

Polarizing Plate

The present invention also includes a polarizing plate having the film of the present invention.

That is, the film of the present invention can be used as a polarizer protection film in the polarizing plate.

In the present invention, the production method of the polarizing plate is not particularly limited, and conventionally known methods may be employed. For example, the film of the present invention is laminated on at least one surface of a polarizer in the usual manner to give a polarizing plate. A preferable lamination method is, for example, as follows. Firstly, the surface of the film of the present invention to be bonded to the polarizer is subjected to alkaline saponification treatment. To at least one surface of the polarizer, an aqueous solution of a completely saponified polyvinyl alcohol is applied, and the film of the present invention and the polarizer are bonded together.

A polarizer is an element which transmits only a light wave polarized along a particular direction. The polarizer used in the present invention is not particularly limited, and conventionally known polarizers can be used. Examples of the polarizer include polyvinyl alcohol (PVA) films, and specifically, PVA films doped with iodine and PVA films doped with a dichroic dye can be used.

PVA films that can preferably be used are produced, for example, as follows: a PVA film is formed from an aqueous polyvinyl alcohol solution and subjected to uniaxial stretching and subsequent doping, or to doping and subsequent uniaxial stretching, and preferably treated for durability enhancement using a boron compound.

The thickness of the polarizer is preferably 1 to 30 µm, and more preferably 1 to 20 µm.

Image Display Device

The present invention also includes an image display device having the polarizing plate of the present invention.

In the present invention, the production method of the image display device is not particularly limited, and conventionally known methods may be employed. The image display device is preferably a liquid crystal display (LCD) or the like.

A liquid crystal display is usually composed of a liquid crystal cell and polarizing plates placed at both sides of the liquid crystal cell. The film of the present invention is preferably placed in contact with the liquid crystal cell. In addition, it is preferable that a prism sheet and a diffusion film are further layered on the liquid crystal display in the usual manner.

The present invention is not limited to particular embodiments described above, and various modifications can be made within the scope of the appended claims. Other embodiments provided by suitably combining technical means disclosed in separate embodiments of the present invention are also within the technical scope of the present invention.

EXAMPLES

Hereinafter, the present invention will be illustrated in more detail by examples, but the present invention is not limited thereto. Modifications can be made as appropriate within the scope of the subject matter described above and below, and all such modifications are within the technical scope of the present invention.

In the following, the sign "%" refers to percent by mass and the unit "part" refers to part by mass unless otherwise specified.

Weight-Average Molecular Weight Etc.

The weight-average molecular weight (Mw), the number-average molecular weight (Mn) and the molecular weight distribution (D) of block polymers, polymers and compositions were determined by gel permeation chromatography (GPC) in terms of polystyrene. The measurement apparatus and the measurement conditions are as follows.

System: GPC system HLC-8220 (manufactured by TOSOH)

Column Composition for Sample Measurement

Guard column: TSK guardcolumn SuperHZ-L (manufactured by TOSOH)

Separation column: TSKgel SuperHZM-M (manufactured by TOSOH), two columns connected in series Column Composition for Reference Measurement Reference column: TSKgel SuperH-RC (manufactured by TOSOH)

Developing solvent: Tetrahydrofuran (special grade, manufactured by Wako Pure Chemical Industries)

Flow rate of developing solvent: 0.6 mL/min

Standard sample: TSK standard polystyrene (PS-Oligomer Kit, manufactured by TOSOH)

Column temperature: 40° C.

Calculation of Monomer Conversion Rate

The conversion rate was determined by measuring the residual amount of the monomer by gas chromatography (model name of apparatus: GC-2014, manufactured by Shimadzu Corporation).

Glass Transition Temperature

The glass transition temperature (Tg) was determined according to JIS K7121. The specific procedure was as follows. In a differential scanning calorimeter (DSC-8230, manufactured by Rigaku Corporation), about 10 mg of a sample was heated from ordinary temperature to 200° C. (heating rate: 20° C./min) under a nitrogen gas atmosphere. From the resulting DSC curve, the glass transition temperature was determined by the onset point method. α-alumina was used as the reference.

Thermal Decomposition Temperature

The thermal decomposition temperature was determined by analyzing samples in the following conditions (dynamic TG technique).

Measuring device: Differential thermal balance (Thermo plus2 TG-8120 dynamic TG, manufactured by Rigaku Corporation)

Measurement conditions:

Sample load: 10 mg

Heating rate: 10° C./min

Atmosphere: Nitrogen flow 200 mL/min

Method: Stepwise Isothermal Analysis Technique (control was carried out at a mass reduction rate of 0.005%/s or less within the range of 150° C. to 500° C.)

N-Phenylmaleimide Content

The N-phenylmaleimide (PMI) content of block copolymers was determined by $^1$H-NMR based on the peak intensity of 7.45 to 7.50 ppm corresponding to the protons at the ortho and para positions of the benzene ring of PMI. In the examples herein, an NMR spectrometer (AV300M, manufactured by BRUKER) was used, and deuterated chloroform (manufactured by Wako Pure Chemical Industries, Ltd.) was used as an NMR measurement solvent.

Foaming Property

For the evaluation of the foaming property of block polymers and polymers, the number of bubbles formed upon heating was measured. The specific procedure was as follows. A block polymer was dried in an oven at 80° C. for at least 12 hours or more, loaded into the cylinder of a melt indexer as specified in JIS-K7210, kept at 290° C. for 20 minutes, and extruded in the shape of a strand. The number of formed bubbles present in the strand between the upper and lower marked lines was counted, and the foaming property was represented as the number of bubbles per gram of the thermoplastic resin composition.

Excellent: 0 to 10 bubbles, Good: 10 to 20 bubbles, Poor: 20 bubbles or more.

Number of Double Folds Before Breakage (MIT Method)

The number of double folds before breakage of films was measured according to JIS P8115. The specific procedure was as follows. Before testing, two types of test film strips (90 mm in length and 15 mm in width) were allowed to stand in conditions of 23° C. and 50% RH for 1 hour or more. With a MIT folding endurance tester (model: DA, manufactured by Toyo Seiki Seisaku-sho, Ltd.), a sample film strip was repeatedly folded at an angle of 135° at a rate of 175 cycles per minute (cpm) under a load of 200 g until the strip was broken. The test was performed using 5 sample strips for each film, and the average of the numbers of double folds before breakage was calculated.

Thickness of Film

The thickness of films was measured with a digimatic micrometer (manufactured by Mitutoyo Corporation). For the measurement and evaluation of the physical properties (including physical properties for which the evaluation methods are described henceforth) of a film, a sample film piece was cut from the central part in the width direction of the film.

Haze of Film

For the determination of the haze value of films, a film piece was immersed in 1,2,3,4-tetrahydronaphthalene (tetralin) in a quartz cell and subjected to measurement with NDH-1001DP manufactured by Nippon Denshoku Industries Co., LTD., and the internal haze value of the film piece per 100 μm was calculated.

Example 1: Synthesis of Block Copolymer (A-1) by Nitroxide Polymerization

Into a reaction vessel equipped with a stirrer, a temperature sensor, a condenser tube and a nitrogen inlet tube, 41 parts of a 60% solution of a polybutyl acrylate having phosphonate unit-containing nitroxide structures at both polymer ends in toluene (Flexibloc D2 (registered trademark), manufactured by Arkema France), 15 parts of phenylmaleimide (PMI), 60 parts of methyl methacrylate (MMA), 0.075 part of n-dodecyl mercaptan (DM) and 50 parts of toluene as a polymerization solvent were fed, and the mixture was heated to 105° C. in nitrogen gas flow. After that, solution polymerization was allowed to proceed under reflux at a temperature of 105 to 110° C. for 2 hours. At the end of the polymerization, the conversion rates of MMA and PMI as calculated from the residual amount of the corresponding monomer in the polymerization reaction mixture were 50% and 46%, respectively. The PMI content of the block copolymer as determined by $^1$H-NMR was 14% by mass.

After the polymerization, the reaction mixture was diluted with 100 parts of methyl ethyl ketone (MEK) and slowly added to a large amount of hexane with stirring.

The precipitated white solid was taken out and then dried at 2.6 kPa and 80° C. for about 1 hour for removal of the solvent. Thus, a block copolymer (A-1) having a polymer block (A) consisting of polybutyl acrylate and polymer blocks (B) consisting of PMI and MMA at both ends of the polymer block (A) was obtained.

A-1 had a weight-average molecular weight of 341,000, a number-average molecular weight of 169,000 and a glass transition temperature of 132° C. The foaming property of A-1 was evaluated as "Excellent".

Example 2: Synthesis of Block Copolymer (A-2) by Nitroxide Polymerization

Into a reaction vessel equipped with a stirrer, a temperature sensor, a condenser tube and a nitrogen inlet tube, 41 parts of a 60% solution of a polybutyl acrylate having phosphonate unit-containing nitroxide structures at both polymer ends in toluene (Flexibloc D2 (registered trademark), manufactured by Arkema France), 15 parts of phenylmaleimide (PMI), 56 parts of methyl methacrylate (MMA), 0.08 part of n-dodecyl mercaptan (DM) and 50 parts of toluene as a polymerization solvent were fed, and the mixture was heated to 105° C. and refluxed in nitrogen gas flow. To this, 4 parts of styrene (St) was added dropwise over 1 hour, and solution polymerization was then allowed to proceed under reflux at a temperature of 105 to 110° C. for 1 hour. At the end of the polymerization, the conversion rates of MMA, PMI and St as calculated from the residual amount of the corresponding monomer in the polymerization reaction mixture were 48%, 48% and 90%, respectively. The PMI content of the block copolymer as determined by $^1$H-NMR was 12% by mass.

After the polymerization, the reaction mixture was diluted with 100 parts of methyl ethyl ketone (MEK) and slowly added to a large amount of hexane with stirring. The precipitated white solid was taken out and then dried at 2.6 kPa and 80° C. for about 1 hour for removal of the solvent. Thus, a block copolymer (A-2) having a polymer block (A) consisting of polybutyl acrylate and polymer blocks (B) consisting of PMI, MMA and St at both ends of the polymer block (A) was obtained.

A-2 had a weight-average molecular weight of 363,000, a number-average molecular weight of 168,000 and a glass transition temperature of 133° C. The foaming property of A-2 was evaluated as "Excellent".

Example 3: Synthesis of Block Copolymer by Nitroxide

Polymerization and Synthesis of Resin Composition (B-1) Containing a Copolymer Produced by Additional Polymerization of Unreacted Monomers 16 parts of Flexibloc D2 (registered trademark), 18 parts of PMI, 72 parts of MMA, 0.05 part of DM and 101 parts of toluene as a polymerization solvent were prepared, and similarly as in Example 1, solution polymerization was allowed to proceed under reflux for 1 hour. At the end of the polymerization, the conversion rates of MMA and PMI as calculated from the amount of the corresponding monomer in the polymerization reaction mixture were 23% and 29%, respectively. Part of the polymerization reaction mixture was taken out, and the resulting block copolymer was isolated in the same manner as in Example 1. The PMI content of the block copolymer as determined by $^1$H-NMR was 19% by mass. In addition, the molecular weight of the block copolymer was determined. As a result, the weight-average molecular weight (Mw) was 392,000, the number-average molecular weight (Mn) was 170,000, and the molecular weight distribution (Mw/Mn) was 2.3.

Next, for additional polymerization of the unreacted monomers, 0.058 part of t-amyl peroxyisononanoate (LUPEROX (registered trademark) 570, manufactured by ARKEMA Yoshitomi, Ltd.) was entirely added at a time, and a solution of 0.115 part of t-amyl peroxyisononanoate (LUPEROX (registered trademark) 570, manufactured by ARKEMA Yoshitomi, Ltd.) in 3.5 parts of toluene was added dropwise over 2 hours. After the completion of dropwise addition, polymerization was allowed to proceed for 5 hours while the temperature was kept between 105° C. and 110° C. Thus, a polymer solution containing a block copolymer having a polymer block (A) consisting of polybutyl acrylate and polymer blocks (B) consisting of PMI and MMA at both ends of the polymer block (A) and a copolymer of PMI and MMA was obtained. At the end of the polymerization, the conversion rates of MMA and PMI as calculated from the residual amount of the corresponding monomer in the polymerization reaction mixture were 98% and 98%, respectively.

The polymer solution was diluted with MEK in such a manner that the polymer solids concentration would be 30% by mass, and then fed into a vented twin-screw extruder (diameter=15 mm, L/D=30) with two vent ports for devolatilization at a barrel temperature of 270° C. at a rotational speed of 200 rpm at a degree of vacuum of 13.3 to 400 hPa (10 to 300 mmHg). Thus, a resin composition (B-1) containing the block copolymer having a polymer block (A) consisting of polybutyl acrylate and polymer blocks (B) consisting of PMI and MMA at both ends of the polymer block (A) and the copolymer of PMI and MMA was obtained. B-1 had a weight-average molecular weight of 181,000, a number-average molecular weight of 57,000, a glass transition temperature of 134° C. and a thermal decomposition temperature of 320° C. The foaming property of B-1 was evaluated as "Excellent".

Comparative Example 1: Synthesis of Block Copolymer (A-3) by Nitroxide Polymerization Into a reaction vessel equipped with a stirrer, a temperature sensor, a condenser tube and a nitrogen inlet tube, 58 parts of Flexibloc D2 (registered trademark), 65 parts of methyl methacrylate (MMA), 0.05 part of DM and 40 parts of toluene as a polymerization solvent were fed, and the mixture was heated to 105° C. in nitrogen gas flow. After that, solution polymerization was allowed to proceed under reflux at a temperature of about 105 to 110° C. for 3 hours. At the end of the polymerization, the conversion rate of MMA as calculated from the amount of the monomer in the polymerization reaction mixture was 20%. Subsequently, the solution and the monomers were exposed to vacuum at 240° C. for removal of the solvent. Thus, a triblock copolymer (A-3) consisting of polybutyl acrylate as the central block and MMA blocks as the both terminal blocks was obtained.

A-3 had a weight-average molecular weight of 181,000, a number-average molecular weight of 113,000 and a glass transition temperature of 107° C. Regarding the thermal decomposition temperature, stepwise weight reduction was observed at a temperature of 267° C. or more, and the isothermal decomposition behavior was observed at 290° C. The foaming property of A-3 was evaluated as "Poor".

Comparative Example 2: Synthesis of PMI-MMA-St Copolymer (C-1)

Into a reaction vessel equipped with a stirrer, a temperature sensor, a condenser tube and a nitrogen inlet tube, 17 parts of phenylmaleimide (PMI), 83 parts of methyl methacrylate (MMA), 0.1 part of n-dodecyl mercaptan (DM) and 110 parts of toluene as a polymerization solvent were fed, and the mixture was heated to 105° C. in nitrogen gas flow. Next, 0.1 part of t-amyl peroxyisononanoate (LUPEROX (registered trademark) 570, manufactured by ARKEMA Yoshitomi, Ltd.) was entirely added at a time, and a solution of 0.2 part of t-amyl peroxyisononanoate (LUPEROX (registered trademark) 570, manufactured by ARKEMA Yoshitomi, Ltd.) in 10 parts of toluene and a solution of 1 part of styrene (St) in 10 parts of toluene were added dropwise over 2 hours. After the completion of dropwise addition, polymerization was allowed to proceed for 6 hours while the temperature was kept between 105° C. and 110° C. Thus, a polymer solution containing a copolymer (C-1) of PMI, MMA and St was obtained. At the end of the polymerization, the conversion rates of MMA, PMI and St as calculated from the residual amount of the corresponding monomer in the polymerization reaction mixture were 97%, 99% and 99%, respectively.

Subsequently, the solution and the monomers were exposed to vacuum at 240° C. for removal of the solvent. Thus, the copolymer (C-1) consisting of PMI, MMA and St was obtained. C-1 had a weight-average molecular weight of 210,000, a number-average molecular weight of 72,000 and a glass transition temperature of 135° C. The foaming property of C-1 was evaluated as "Excellent".

Comparative Example 3: Synthesis of PMI-MMA Copolymer (C-2)

Into a reaction vessel equipped with a stirrer, a temperature sensor, a condenser tube and a nitrogen inlet tube, 40 parts of phenylmaleimide (PMI), 60 parts of methyl methacrylate (MMA), 0.1 part of n-dodecyl mercaptan (DM) and 120 parts of toluene as a polymerization solvent were fed, and the mixture was heated to 105° C. in nitrogen gas flow. Next, 0.1 part of t-amyl peroxyisononanoate (LUPEROX (registered trademark) 570, manufactured by ARKEMA Yoshitomi, Ltd.) was entirely added at a time, and a solution of 0.2 part of t-amyl peroxyisononanoate (LUPEROX (registered trademark) 570, manufactured by ARKEMA Yoshitomi, Ltd.) in 10 parts of toluene was added dropwise over 2 hours. After the completion of dropwise addition, polymerization was allowed to proceed for 6 hours while the temperature was kept between 105° C. and 110° C. Thus, a polymer solution containing a copolymer (C-2) of PMI and MMA was obtained. At the end of the polymerization, the conversion rates of MMA and PMI as calculated from the residual amount of the corresponding monomer in the polymerization reaction mixture were 96% and 95%, respectively.

Subsequently, the solution and the monomers were exposed to vacuum at 240° C. for removal of the solvent. Thus, the copolymer (C-2) of PMI and MMA was obtained. C-2 had a weight-average molecular weight of 180,000, a number-average molecular weight of 42,000 and a glass transition temperature of 155° C. The foaming property of C-2 was evaluated as "Excellent".

Example 4: Synthesis of Block Copolymer (A-4) by Nitroxide Polymerization

Into a reaction vessel equipped with a stirrer, a temperature sensor, a condenser tube and a nitrogen inlet tube, 41 parts of a 60% solution of a polybutyl acrylate having phosphonate unit-containing nitroxide structures at both polymer ends in toluene (Flexibloc D2 (registered trademark), manufactured by Arkema France), 22 parts of phenylmaleimide (PMI), 28 parts of methyl methacrylate (MMA), 3 parts of acrylonitrile (AN), 0.1 part of n-dodecyl mercaptan (DM) and 60 parts of toluene as a polymerization solvent were fed, and the mixture was heated to 105° C. in nitrogen gas flow. To this, 30 parts of styrene (St) was added dropwise over 1 hour, and solution polymerization was then allowed to proceed under reflux at a temperature of 105 to 110° C. for 1 hour. At the end of the polymerization, the conversion rates of MMA, PMI, St and AN as calculated from the residual amount of the corresponding monomer in the polymerization reaction mixture were 38%, 48%, 65% and 70%, respectively. The PMI content of the block copolymer as determined by $^1$H-NMR was 22% by mass.

After the polymerization, the reaction mixture was diluted with 100 parts of methyl ethyl ketone (MEK) and slowly added to a large amount of hexane with stirring. The precipitated white solid was taken out and then dried at 2.6 kPa and 80° C. for about 1 hour for removal of the solvent. Thus, a block copolymer (A-4) having a polymer block (A) consisting of polybutyl acrylate and polymer blocks (B) consisting of PMI, MMA, St and AN at both ends of the polymer block (A) was obtained.

(A-4) had a weight-average molecular weight of 251,000, a number-average molecular weight of 132,000 and a glass transition temperature of 132° C. The foaming property of (A-4) was evaluated as "Excellent".

The results of Examples 1 to 4 and Comparative Examples 1 to 3 are shown in Table 1.

The comparison of Examples 1 and 2 with Comparative Example 1 shows that block copolymers having an N-substituted maleimide ring structure have higher heat resistance.

TABLE 1

| | | Example 1 | Example 2 | Comparative Example 1 | Example 3 | Comparative Example 2 | Comparative Example 3 | Example 4 |
|---|---|---|---|---|---|---|---|---|
| Feed amount (part) | MMA | 60 | 56 | 65 | 72 | 83 | 60 | 28 |
| | PMI | 15 | 15 | 0 | 18 | 17 | 40 | 22 |
| | St | 0 | 4 | 0 | 0 | 1 | 0 | 30 |
| | AN | 0 | 0 | 0 | 0 | 0 | 0 | 3 |
| | Flexibloc D2 | 41 | 41 | 58 | 16 | 0 | 0 | 41 |
| | SH compound (DM) | 0.075 | 0.08 | 0.05 | 0.05 | 0.1 | 0.1 | 0.1 |
| Radical polymerization of unreacted monomers | | Not done | Not done | Not done | Done | Done | Done | Not done |
| Block copolymer (A-) Resin composition containing a block copolymer (B-) Polymer not containing a block copolymer (C-) | | A-1 | A-2 | A-3 | B-1 | C-1 | C-2 | A-4 |
| Tg (° C.) | | 132 | 133 | 107 | 134 | 135 | 155 | 132 |
| Foaming property | | Excellent | Excellent | Poor | Excellent | Excellent | Excellent | Excellent |

Example 5

The resin composition (B-1) was subjected to pressing at 250° C. to form a 120-μm-thick film. Next, the film was stretched 2 times in length and 2 times in width at 160° C. (Tg+23° C.) to give a biaxially oriented film. The Tg, thickness, haze and number of double folds before breakage of the obtained biaxially oriented film are shown in Table 2.

Examples 6 and 7 and Comparative Example 4

The copolymers obtained in Examples 1 and 2 and Comparative Examples 1 to 3 were mixed at the ratios indicated in Table 2 with a Labo Plastomill at 270° C. for 5 minutes to give various resin compositions (B-2 to B-4). The obtained resin compositions were separately processed in the same manner as in Example 5 to give biaxially oriented films. The Tg, thickness, haze and number of double folds before breakage of the obtained biaxially oriented films are shown in Table 2.

Comparative Examples 5 and 6

The copolymers (C-1) and (C-2) synthesized in Comparative Examples 2 and 3 were separately processed in the same manner as in Example 5 to give press films and biaxially oriented films. The Tg, thickness, haze and number of double folds before breakage of the obtained biaxially oriented films are shown in Table 2.

In Comparative Example 6, the film formed by pressing was so brittle that it was broken at the time of biaxial stretching.

TABLE 2

| | Example 5 | Example 6 | Example 7 | Comparative Example 4 | Comparative Example 5 | Comparative Example 6 |
|---|---|---|---|---|---|---|
| Composition ratio (part by weight) | B-1 (100) | A-1 (30) C-1 (70) | A-2 (20) C-2 (80) | A-3 (20) C-1 (80) | C-1 (100) | C-2 (100) |
| Resin composition containing a block copolymer (B-) Polymer not containing a block copolymer (C-) | B-1 | B-2 | B-3 | B-4 | C-1 | C-2 |
| Physical properties of film — Thickness (μm) | 30 | 30 | 30 | bubble formed, uneven | 30 | too brittle to stretch |
| Tg (° C.) | 134 | 133 | 155 | | 135 | |
| Haze (%) | 0.2 | 0.2 | 1.3 | | 0.2 | |
| MIT | 2200 | 2300 | 1200 | | 50 | |

The results of Examples 5 to 7 show that the films formed of the block copolymers obtained by the production method of the present invention or of the resin compositions containing the block copolymers are excellent in heat resistance, transparency, flexibility and strength.

Example 8: Synthesis of Block Copolymer (A-5) by Nitroxide Polymerization 16 parts of Flexibloc D2 (registered trademark), 18 parts of PMI, 72 parts of MMA, 0.1 part of DM and 101 parts of toluene as a polymerization solvent were prepared, and similarly as in Example 3, solution polymerization was allowed to proceed under reflux for 1 hour. At the end of the polymerization, the conversion rates of MMA and PMI as calculated from the amount of the corresponding monomer in the polymerization reaction mixture were 23% and 29%, respectively. Part of the polymerization reaction mixture was taken out, and the resulting block copolymer (A-5) was isolated in the same manner as in Example 1. The PMI content of the block copolymer as determined by $^1$H-NMR was 19% by mass.

After the polymerization, the reaction mixture was diluted with 100 parts of methyl ethyl ketone (MEK) and slowly added to a large amount of hexane with stirring.

The precipitated white solid was taken out and then dried at 2.6 kPa and 80° C. for about 1 hour for removal of the solvent. Thus, a block copolymer (A-5) having a polymer block (A) consisting of polybutyl acrylate and polymer blocks (B) consisting of PMI and MMA at both ends of the polymer block (A) was obtained.

(A-5) had a weight-average molecular weight of 262,000, a number-average molecular weight of 134,000, a glass transition temperature of 135° C. and a thermal decomposition temperature of 319° C. In addition, the sample residue after the measurement of the thermal decomposition temperature was tested for dissolution in chloroform. As a result, the sample residue was uniformly dissolved in chloroform and no insoluble matter was observed.

Comparative Example 7: Synthesis of Block Copolymer (A-6) by Nitroxide Polymerization Similarly as in Example 8, but without DM, solution polymerization was allowed to proceed under reflux for 1 hour. At the end of the polymerization, the conversion rates of MMA and PMI as calculated from the amount of the corresponding monomer in the polymerization reaction mixture were 26% and 31%, respectively. Part of the polymerization reaction mixture was taken out, and the resulting block copolymer (A-6) was isolated in the same manner as in Example 1. The PMI content of the block copolymer as determined by $^1$H-NMR was 19% by mass.

After the polymerization, the reaction mixture was diluted with 100 parts of methyl ethyl ketone (MEK) and slowly added to a large amount of hexane with stirring. The precipitated white solid was taken out and then dried at 2.6 kPa and 80° C. for about 1 hour for removal of the solvent. Thus, a block copolymer (A-6) having a polymer block (A) consisting of polybutyl acrylate and polymer blocks (B) consisting of PMI and MMA at both ends of the polymer block (A) was obtained.

(A-6) had a weight-average molecular weight of 492,000, a number-average molecular weight of 231,000, a glass transition temperature of 135° C. and a thermal decomposition temperature of 298° C. In addition, the sample residue after the measurement of the thermal decomposition temperature was tested for dissolution in chloroform. As a result, insolubility attributable to decomposition was observed.

Example 9: Synthesis of Block Copolymer by Nitroxide Polymerization and Synthesis of Resin Composition (B-5) Containing a Copolymer Produced by Additional Polymerization of Unreacted Monomers 16 parts of Flexibloc D2 (registered trademark), 18 parts of PMI, 72 parts of MMA, 0.1 part of DM and 101 parts of toluene as a polymerization solvent were prepared, and similarly as in Example 1, solution polymerization was allowed to proceed under reflux for 1 hour. At the end of the polymerization, the conversion rates of MMA and PMI as calculated from the amount of the corresponding monomer in the polymerization reaction mixture were 22% and 26%, respectively. Part of the polymerization reaction mixture was taken out, and the resulting block copolymer was isolated in the same manner as in Example 1. The PMI content of the block copolymer as determined by $^1$H-NMR was 19% by mass. In addition, the molecular weight of the block copolymer was determined. As a result, the weight-average molecular weight (Mw) was 271,000, the number-average molecular weight (Mn) was 126,000, and the molecular weight distribution (Mw/Mn) was 2.2.

Next, for additional polymerization of the unreacted monomers, 0.058 part of t-amyl peroxyisononanoate (LUPEROX (registered trademark) 570, manufactured by ARKEMA Yoshitomi, Ltd.) was entirely added at a time, and a solution of 0.115 part of t-amyl peroxyisononanoate (LUPEROX (registered trademark) 570, manufactured by ARKEMA Yoshitomi, Ltd.) in 3.5 parts of toluene was added dropwise over 2 hours. After the completion of dropwise addition, polymerization was allowed to proceed for 5 hours while the temperature was kept between 105° C. and 110° C. Thus, a polymer solution containing a block copolymer having a polymer block (A) consisting of polybutyl acrylate and polymer blocks (B) consisting of PMI and MMA at both ends of the polymer block (A) and a copolymer of PMI and MMA was obtained. At the end of the polymerization, the conversion rates of MMA and PMI as calculated from the residual amount of the corresponding monomer in the polymerization reaction mixture were 98% and 97%, respectively.

The polymer solution was diluted with MEK in such a manner that the polymer solids concentration would be 30% by mass, and then fed into a vented twin-screw extruder (diameter=15 mm, L/D=30) with two vent ports for devolatilization at a barrel temperature of 270° C. at a rotational speed of 200 rpm at a degree of vacuum of 13.3 to 400 hPa (10 to 300 mmHg). Thus, a resin composition (B-5) containing the block copolymer having a polymer block (A) consisting of polybutyl acrylate and polymer blocks (B) consisting of PMI and MMA at both ends of the polymer block (A) and the copolymer of PMI and MMA was obtained. B-5 had a weight-average molecular weight of 152,000, a number-average molecular weight of 50,000, a glass transition temperature of 134° C. and a thermal decomposition temperature of 326° C.

Evaluation of Amount of Maleimide Dissociated

Comparative Example 8: Synthesis of PMI-MMA Copolymer (C-3)

Into a reaction vessel equipped with a stirrer, a temperature sensor, a condenser tube and a nitrogen inlet tube, 20 parts of phenylmaleimide (PMI), 80 parts of methyl methacrylate (MMA), 0.1 part of n-dodecyl mercaptan (DM) and 110 parts of toluene as a polymerization solvent were fed, and the mixture was heated to 105° C. in nitrogen gas flow. Next, 0.1 part of t-amyl peroxyisononanoate (LUPEROX (registered trademark) 570, manufactured by ARKEMA Yoshitomi, Ltd.) was entirely added at a time, and a solution of 0.2 part of t-amyl peroxyisononanoate (LUPEROX (registered trademark) 570, manufactured by ARKEMA Yoshitomi, Ltd.) in 10 parts of toluene was added dropwise over 2 hours. After the completion of dropwise addition, polymerization was allowed to proceed for 6 hours while the temperature was kept between 105° C. and 110° C. Thus, a polymer solution containing a copolymer of PMI and MMA was obtained. At the end of the polymerization, the conversion rates of MMA and PMI as calculated from the residual amount of the corresponding monomer in the polymerization reaction mixture were 97% and 99%, respectively.

Subsequently, the solution and the monomers were exposed to vacuum at 240° C. for removal of the solvent. Thus, the copolymer (C-3) of PMI and MMA was obtained. C-3 had a weight-average molecular weight of 210,000, a number-average molecular weight of 68,000 and a glass transition temperature of 134° C.

In addition, part of the polymer solution after the polymerization in Example 9 was taken out, and the solution and the monomers were exposed to vacuum at 240° C. for removal of the solvent. Thus, the copolymer (B-5-2) of PMI and MMA was obtained.

The residual amount of PMI in the copolymer was measured by gas chromatography (apparatus: a gas chromatograph (6890 series) coupled to a quadrupole mass spectrometer (JWS-K9) (manufactured by JEOL Ltd.), which was connected to a thermal decomposition system (manufactured by Gerstel)). As a result, the residual amount of PMI in (B-5-2) was 50 ppm, and the residual amount of PMI in (C-3) was 80 ppm. The results show that the production method of the present invention can reduce the amount of the unreacted maleimide monomer.

Next, a thermal decomposition test was performed for (B-5-2) and (C-3) in the following conditions, and the amount of PMI dissociated was evaluated.
Purge-and-Trap Method
Apparatus: a gas chromatograph (6890 series) coupled to a quadrupole mass spectrometer (JWS-K9) (manufactured by JEOL Ltd.), which was connected to a thermal decomposition system (manufactured by Gerstel)
Thermal decomposition conditions: 280° C., 30 minutes The amount of PMI dissociated from (B-5-2) was 130 ppm, and the amount of PMI dissociated from (C-3) was 250 ppm. The results show that the copolymer obtained by the production method of the present invention is resistant to heat decomposition and to heat dissociation of the maleimide monomer from the copolymer.

Example 10: Synthesis of Block Copolymer by Nitroxide Polymerization and Synthesis of Resin Composition (B-6) Containing a Copolymer Produced by Additional Polymerization of Unreacted Monomers 16 parts of Flexibloc D2 (registered trademark), 22.5 parts of cyclohexylmaleimide (CMI), 65 parts of MMA, 0.1 part of DM and 95 parts of toluene as a polymerization solvent were prepared, and similarly as in Example 1, solution polymerization was allowed to proceed under reflux for 1 hour. At the end of the polymerization, the conversion rates of MMA and CMI as calculated from the amount of the corresponding monomer in the polymerization reaction mixture were 30% and 14%, respectively. Part of the polymerization reaction mixture was taken out, and the resulting block copolymer was isolated in the same manner as in Example 1. The CMI content of the block copolymer as determined by $^1$H-NMR was 21% by mass. In addition, the molecular weight of the block copolymer was determined. As a result, the weight-average molecular weight (Mw) was 236,000, the number-average molecular weight (Mn) was 107,000, and the molecular weight distribution (Mw/Mn) was 2.2.

Next, for additional polymerization of the unreacted monomers, 0.058 part of t-amyl peroxyisononanoate (LUPEROX (registered trademark) 570, manufactured by ARKEMA Yoshitomi, Ltd.) was entirely added at a time, and a solution of 0.115 part of t-amyl peroxyisononanoate (LUPEROX (registered trademark) 570, manufactured by ARKEMA Yoshitomi, Ltd.) in 3.5 parts of toluene was added dropwise over 2 hours. After the completion of dropwise addition, polymerization was allowed to proceed for 5 hours while the temperature was kept between 105° C. and 110° C. Thus, a polymer solution containing a block copolymer having a polymer block (A) consisting of polybutyl acrylate and polymer blocks (B) consisting of CMI and MMA at both ends of the polymer block (A) and a copolymer of CMI and MMA was obtained. At the end of the polymerization, the conversion rates of MMA and CMI as calculated from the residual amount of the corresponding monomer in the polymerization reaction mixture were 98% and 98%, respectively.

The polymer solution was diluted with 100 parts of methyl ethyl ketone (MEK) and slowly added to a large amount of hexane with stirring. The precipitated white solid was taken out and then dried at 2.6 kPa and 200° C. for about 1 hour for removal of the solvent. Thus, a resin composition (B-6) containing the block copolymer having a polymer block (A) consisting of polybutyl acrylate and polymer blocks (B) consisting of CMI and MMA at both ends of the polymer block (A) and the copolymer of CMI and MMA was obtained. B-6 had a weight-average molecular weight of 127,000, a number-average molecular weight of 41,000, a glass transition temperature of 133° C. and a thermal decomposition temperature of 322° C.

The results of Examples 8 to 10 and Comparative Example 7 are shown in Table 3.

TABLE 3

|  |  | Example 8 | Comparative Example 7 | Example 9 | Example 10 |
|---|---|---|---|---|---|
| Feed amount (part) | MMA | 72 | 72 | 72 | 65 |
|  | PMI | 18 | 18 | 18 | 0 |
|  | CMI | 0 | 0 | 0 | 22.5 |
|  | St | 0 | 0 | 0 | 0 |
|  | Flexibloc D2 | 16 | 16 | 16 | 16 |
|  | SH compound (DM) | 0.1 | 0 | 0.1 | 0.1 |
| Radical polymerization of unreacted monomers |  | Not done | Not done | Done | Done |
| Block copolymer (A-) Resin composition containing a block copolymer (B-) Polymer not containing a block copolymer (C-) |  | A-5 | A-6 | B-5 | B-6 |
| Tg (° C.) |  | 135 | 135 | 134 | 133 |
| Thermal decomposition temperature (° C.) |  | 319 | 298 | 326 | 322 |

The results show that the block copolymers and the resin compositions obtained in the indicated Examples are highly heat resistant.

Particularly, the comparison of Example 8 and Comparative Example 7 shows that a block copolymer having a relatively smaller molecular weight has higher heat resistance. Also shown is that such a block copolymer is free from heat-induced changes, such as heat-insolubilization, and excellent in thermostability.

In addition, the comparison of (B-1) obtained in Example 3 and (B-5) obtained in Example 9 confirms the tendency that the increase in the amount of DM used leads to smaller molecular weight and higher heat resistance.

Example 11: Synthesis of Block Polymer by Nitroxide Polymerization and Resin Composition (B-7) Containing a Copolymer Produced by Additional Polymerization of Unreacted Monomers 13 parts of Flexibloc D2 (registered trademark), 17 parts of PMI, 71 parts of MMA, 0.10 part of DM and 93 parts of toluene as a polymerization solvent were prepared, and similarly as in Example 1, solution polymerization was allowed to proceed under reflux for 1 hour. At the end of the polymerization, the conversion rates of MMA and PMI as calculated from the amount of the corresponding monomer in the polymerization reaction mixture were 33% and 34%, respectively. Part of the polymerization reaction mixture was taken out, and the resulting block copolymer was isolated in the same manner as in Example 1. The PMI content of the block copolymer as determined by $^1$H-NMR was 18% by mass. In addition, the molecular weight of the block copolymer was determined. As a result, the weight-average molecular weight (Mw) was 284,000, the number-average molecular weight (Mn) was 127,000, and the molecular weight distribution (Mw/Mn) was 2.2.

Next, for additional polymerization of the unreacted monomers, 0.035 part of t-amyl peroxyisononanoate (LU-PEROX (registered trademark) 570, manufactured by ARKEMA Yoshitomi, Ltd.) was entirely added at a time, and a solution consisting of 3.9 parts of styrene (St), 0.44 part of toluene and 0.087 part of the polymerization initiator t-amyl peroxyisononanoate (LUPEROX (registered trademark) 570, manufactured by ARKEMA Yoshitomi, Ltd.) was added dropwise over 5 hours.

After the completion of dropwise addition, polymerization was allowed to proceed for 2 hours while the temperature was kept between 100° C. and 110° C. Subsequently, 0.009 part of ethylacetoacetate aluminum diisopropylate (ALCH, manufactured by Kawaken Fine Chemicals Co., Ltd.) was added. Thus, a polymer solution containing a block copolymer having a polymer block (A) consisting of polybutyl acrylate and polymer blocks (B) consisting of PMI and MMA at both ends of the polymer block (A) and a copolymer of PMI, MMA and St was obtained. At the end of the polymerization, the conversion rates of MMA, PMI and St as calculated from the amount of the corresponding monomer in the polymer solution were 95%, 99% and 96%, respectively. To the polymer solution, a solution of 0.66 part of an ultraviolet absorber ("ADK STAB (registered trademark) LA-F70", manufactured by ADEKA) in 1.23 parts of toluene was added. Further, this solution was diluted with toluene in such a manner that the polymer solids concentration would be 30% by mass, and then fed into a vented twin-screw extruder (diameter=15 mm, L/D=30) with three vent ports for devolatilization at a barrel temperature of 270° C. at a rotational speed of 200 rpm at a degree of vacuum of 13.3 to 400 hPa (10 to 300 mmHg). Thus, a resin composition (B-7) containing the block copolymer having a polymer block (A) consisting of polybutyl acrylate and polymer blocks (B) consisting of PMI and MMA at both ends of the polymer block (A) and the copolymer of PMI, MMA and St was obtained.

B-7 had a weight-average molecular weight of 170,000, a number-average molecular weight of 62,000, a glass transition temperature of 134° C. and a thermal decomposition temperature of 320° C. The foaming property of B-7 was evaluated as "Excellent".

Example 12: Synthesis of Block Polymer by Nitroxide Polymerization and Resin Composition (B-8) Containing a Copolymer Produced by Additional Polymerization of Unreacted Monomers The same procedure as described in Example 11 was performed except that 0.005 part of tetraethoxysilane (KBE-04, manufactured by Shin-Etsu Chemical Co., Ltd.) was used instead of 0.009 part of ethylacetoacetate aluminum diisopropylate. Thus, a polymer solution containing a block copolymer having a polymer block (A) consisting of polybutyl acrylate and polymer blocks (B) consisting of PMI and MMA at both ends of the polymer block (A) and a copolymer of PMI, MMA and St was obtained. At the end of the polymerization, the conversion rates of MMA, PMI and St as calculated from the amount of the corresponding monomer in the polymer solution were 95%, 99% and 96%, respectively. To the polymer solution, a solution of 0.66 part of an ultraviolet absorber ("ADK STAB (registered trademark) LA-F70", manufactured by ADEKA) in 1.23 parts of toluene was added. Further, this solution was diluted with toluene in such a manner that the polymer solids concentration would be 30% by mass, and then devolatilized similarly as in Example 11. Thus, a resin composition (B-8) containing the block copolymer having a polymer block (A) consisting of polybutyl acrylate and polymer blocks (B) consisting of PMI and MMA at both ends of the polymer block (A) and the copolymer of PMI, MMA and St was obtained.

B-8 had a weight-average molecular weight of 169,000, a number-average molecular weight of 63,000, a glass transition temperature of 134° C. and a thermal decomposition temperature of 319° C. The foaming property of B-8 was evaluated as "Excellent".

In addition, the molecular weight of the block copolymer prior to the additional polymerization was determined. As a result, the weight-average molecular weight (Mw) was 288,000, the number-average molecular weight (Mn) was 129,000, and the molecular weight distribution (Mw/Mn) was 2.2.

Example 13: Synthesis of Block Polymer by Nitroxide Polymerization and Resin Composition (B-9) Containing a Copolymer Produced by Additional Polymerization of Unreacted Monomers The same procedure as described in Example 11 was performed except that 0.05 part of Irganox 1010 (manufactured by BASF Japan Ltd.), 0.05 part of ADK STAB AO-4125 and 0.05 part of ADK STAB 2112 (both are manufactured by ADEKA) were used as antioxidants instead of 0.009 part of ethylacetoacetate aluminum diisopropylate. Thus, a polymer solution containing a block copolymer having a polymer block (A) consisting of polybutyl acrylate and polymer blocks (B) consisting of PMI and MMA at both ends of the polymer block (A) and a copolymer of PMI, MMA and St was obtained. At the end of the polymerization, the conversion rates of MMA, PMI and St as calculated from the amount of the corresponding monomer in the polymer solution were 95%, 99% and 96%, respectively. To the polymer solution, a solution of 0.66 part of an ultraviolet absorber ("ADK STAB (registered trademark) LA-F70", manufactured by ADEKA) in 1.23 parts of toluene was added. Further, this solution was diluted with toluene in such a manner that the polymer solids concentration would be 30% by mass, and then devolatilized similarly as in Example 11. Thus, a resin composition (B-9) containing the block copolymer having a polymer block (A) consisting of polybutyl acrylate and polymer blocks (B) consisting of PMI and MMA at both ends of the polymer block (A) and the copolymer of PMI, MMA and St was obtained.

B-9 had a weight-average molecular weight of 168,000, a number-average molecular weight of 62,000, a glass transition temperature of 134° C. and a thermal decomposition temperature of 324° C. The foaming property of B-9 was evaluated as "Excellent".

In addition, the molecular weight of the block copolymer prior to the additional polymerization was determined. As a result, the weight-average molecular weight (Mw) was 284,000, the number-average molecular weight (Mn) was 127,000, and the molecular weight distribution (Mw/Mn) was 2.2.

Example 14: Synthesis of Block Polymer by Nitroxide Polymerization and Resin Composition (B-10) Containing a Copolymer Produced by Additional Polymerization of Unreacted Monomers 13 parts of Flexibloc D2 (registered trademark), 17 parts of PMI, 71 parts of MMA, 0.10 part of DM and 93 parts of toluene as a polymerization solvent were prepared, and similarly as in Example 1, solution polymerization was allowed to proceed under reflux for 1 hour. At the end of the polymerization, the conversion rates of MMA and PMI as calculated from the amount of the corresponding monomer in the polymerization reaction mixture were 33% and 34%, respectively. Part of the polymerization reaction mixture was taken out, and the resulting block copolymer was isolated in the same manner as in Example 1. The PMI content of the block copolymer as determined by $^1$H-NMR was 18% by mass. In addition, the molecular weight of the block copolymer was determined. As a result, the weight-average molecular weight (Mw) was 285,000, the number-average molecular weight (Mn) was 126,000, and the molecular weight distribution (Mw/Mn) was 2.2.

Next, for additional polymerization of the unreacted monomers, 0.035 part of t-amyl peroxyisononanoate (LUPEROX (registered trademark) 570, manufactured by ARKEMA Yoshitomi, Ltd.) was entirely added at a time, and a solution consisting of 3.9 parts of styrene (St), 0.44 part of toluene and 0.087 part of the polymerization initiator t-amyl peroxyisononanoate (LUPEROX (registered trademark) 570, manufactured by ARKEMA Yoshitomi, Ltd.) was added dropwise over 5 hours. After the completion of dropwise addition, polymerization was allowed to proceed for 2 hours while the temperature was kept between 100° C. and 110° C. Thus, a polymer solution containing a block copolymer having a polymer block (A) consisting of polybutyl acrylate and polymer blocks (B) consisting of PMI and MMA at both ends of the polymer block (A) and a copolymer of PMI, MMA and St was obtained.

At the end of the polymerization, the conversion rates of MMA, PMI and St as calculated from the amount of the corresponding monomer in the polymer solution were 95%, 99% and 96%, respectively. The polymer solution was diluted with toluene in such a manner that the polymer solids concentration would be 30% by mass, and then fed into a vented twin-screw extruder (diameter=15 mm, L/D=30) with three vent ports and side feeders at a barrel temperature of 270° C. at a rotational speed of 200 rpm at a degree of vacuum of 13.3 to 400 hPa (10 to 300 mmHg). In the vented twin-screw extruder, while devolatilization was performed at a speed of 105 parts/hour (in terms of amount of resin), the polymer solution was kneaded with the antioxidants Songnox 1790 (manufactured by SONGWON), ADK STAB AO-4125 and ADK STAB 2112 each fed at 0.05 part/hour and an ultraviolet absorber ("ADK STAB (registered trademark) LA-31", manufactured by ADEKA) fed at 2.0 parts/hour from the side feeders. Thus, a resin composition (B-10) containing the block copolymer having a polymer block (A) consisting of polybutyl acrylate and polymer blocks (B) consisting of PMI and MMA at both ends of the polymer block (A) and the copolymer of PMI, MMA and St was obtained.

B-10 had a weight-average molecular weight of 169,000, a number-average molecular weight of 64,000, a glass transition temperature of 134° C. and a thermal decomposition temperature of 323° C. The foaming property of B-10 was evaluated as "Excellent".

The results of Examples 11 to 14 are shown in Table 4.

TABLE 4

| | | Example 11 | Example 12 | Example 13 | Example 14 |
|---|---|---|---|---|---|
| Feed amount (part) | MMA | 71 | 71 | 71 | 71 |
| | PMI | 17 | 17 | 17 | 17 |
| | St | 3.9 | 3.9 | 3.9 | 3.9 |
| | Flexibloc D2 | 13 | 13 | 13 | 13 |
| | SH compound (DM) | 0.1 | 0.1 | 0.1 | 0.1 |
| Radical polymerization of unreacted monomers | | Done | Done | Done | Done |
| Feed amount (part) of additive | ALCH | 0.009 | — | — | — |
| | KBE-04 | — | 0.005 | — | — |
| | LA-F70 | 0.65 | 0.65 | 0.65 | — |
| | LA-31 | — | — | — | 2.0 |
| | Irganox 1010 | — | — | 0.05 | — |
| | Songnox 1790 | — | — | — | 0.05 |
| | AO-412S | — | — | 0.05 | 0.05 |
| | 2112 | — | — | 0.05 | 0.05 |
| Resin composition containing a block copolymer (B-) | | B-7 | B-8 | B-9 | B-10 |
| Tg (° C.) | | 134 | 134 | 134 | 134 |
| Foaming property | | Excellent | Excellent | Excellent | Excellent |

Comparative Example 9

30 parts of the block copolymer (A-6) obtained in Comparative Example 7 and 70 parts of the polymer (C-1) obtained in Comparative Example 2 were mixed with a Labo Plastomill at 270° C. for 5 minutes to give a resin composition (B-11). The Tg of the resin composition (B-11) was 133° C.

Examples 15 to 18

The resin compositions (B-7), (B-8), (B-9), (B-10) and (B-11) were separately subjected to pressing at 250° C. to form 120-μm-thick films.

Next, the films were stretched 2 times in length and 2 times in width at Tg+23° C. to give biaxially oriented films. The Tg, thickness, haze and number of double folds before breakage of the obtained biaxially oriented films were measured.

In addition, the resin compositions (B-7), (B-8), (B-9), (B-10) and (B-11) were separately subjected to pressing at 250° C. with a manual heat press (model: IMC-180C, manufactured by Imoto Machinery Co., Ltd.) to give 160-μm-thick films. For the determination of the internal haze value of each film, a piece of the film was immersed in 1,2,3,4-tetrahydronaphthalene (tetralin) in a quartz cell and subjected to measurement with NDH-1001DP manufactured by Nippon Denshoku Industries Co., LTD., and the measured value was converted to the value for 100 Next, after heating for 20 minutes at 250° C. in the manual heat press, the internal haze value (per 100 μm) was determined, and the percentage (%) of change in internal haze before and after heating was determined.

The results are shown in the following table.

TABLE 5

| | | Example 15 | Example 16 | Example 17 | Example 18 | Comparative Example 9 |
|---|---|---|---|---|---|---|
| Resin composition containing a block copolymer (B-) | | B-7 | B-8 | B-9 | B-10 | B-11 |
| Physical properties of film | Thickness (μm) | 30 | 30 | 30 | 30 | 30 |
| | Tg (° C.) | 134 | 134 | 134 | 134 | 133 |
| | Haze (%) | 0.2 | 0.2 | 0.2 | 0.2 | 0.4 |
| | MIT | 1200 | 1200 | 1200 | 1200 | 2200 |
| Percentage (%) of change in internal haze before and after heating | | 0.3 | 0.3 | 0.3 | 0.3 | 0.9 |

As clearly shown in the results in the above table, the adjustment of the molecular weight etc. is effective in obtaining a block copolymer or a resin composition which has favorable physical properties, changes only slightly in internal haze before and after heating, and is excellent in thermostability.

INDUSTRIAL APPLICABILITY

The present invention enables efficient production of a maleimide block copolymer which has an acrylic monomer-derived structural unit and is excellent in flexibility and strength.

The invention claimed is:

1. A block copolymer having a polymer block (A) containing an acrylate-derived structural unit and a polymer block (B) containing an N-substituted maleimide ring structure and a methacrylate-derived structural unit, the block copolymer having a weight-average molecular weight of 150,000 to 400,000 and a thermal decomposition temperature of 280° C. to 350° C., wherein the polymer block (B) comprises an additional unit and wherein the proportion of the additional unit in the polymer block (B) is 0.1 to 20% by weight.

2. A resin composition containing the block copolymer according to claim 1.

3. A resin composition containing a block copolymer having a polymer block (A) containing an acrylate-derived structural unit and a polymer block (B) containing an N-substituted maleimide ring structure and a methacrylate-derived structural unit, wherein the resin composition contains, as resin components, the block copolymer and a resin having a structural unit derived from at least a methacrylate and an N-substituted maleimide, and wherein the weight-average molecular weight of all the resin components is 50,000 to 500,000.

4. A film containing the block copolymer according to claim 1.

5. A film containing the resin composition according to claim 2.

6. A film containing the resin composition according to claim 3.

7. The film according to claim 4, wherein the film is an optical film.

8. The film according to claim 5, wherein the film is an optical film.

9. The film according to claim 6, wherein the film is an optical film.

10. The film according to claim 4, wherein the film is a polarizer protection film.

11. The film according to claim 5, wherein the film is a polarizer protection film.

12. The film according to claim 6, wherein the film is a polarizer protection film.

13. A polarizing plate having the film according to claim 4.

14. A polarizing plate having the film according to claim 5.

15. A polarizing plate having the film according to claim 6.

16. An image display device having the polarizing plate according to claim 13.

17. An image display device having the polarizing plate according to claim 14.

18. An image display device having the polarizing plate according to claim 15.

19. The block copolymer according to claim 1, wherein the additional unit is a monomer selected from the group consisting of styrene, methacrylic acid, acrylic acid, a vinyl compound, an α,β-unsaturated nitrile, and an olefin.

20. The block copolymer according to claim 1, wherein the additional unit comprises styrene monomer.

21. The resin composition according to claim 3, wherein the block copolymer has a weight-average molecular weight of 150,000 to 400,000.

* * * * *